US012786135B2

(12) United States Patent
Oishi et al.

(10) Patent No.: US 12,786,135 B2
(45) Date of Patent: Nov. 3, 2026

(54) COMMUNICATION DEVICE AND IN-VEHICLE ELECTRONIC DEVICE

(71) Applicant: Hitachi Astemo, Ltd., Hitachinaka (JP)

(72) Inventors: Yuji Oishi, Tokyo (JP); Koji Maeda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 254 days.

(21) Appl. No.: 18/837,754

(22) PCT Filed: Feb. 28, 2023

(86) PCT No.: PCT/JP2023/007357
§ 371 (c)(1),
(2) Date: Aug. 12, 2024

(87) PCT Pub. No.: WO2023/203884
PCT Pub. Date: Oct. 6, 2023

(65) Prior Publication Data

US 2025/0158936 A1 May 15, 2025

(30) Foreign Application Priority Data

Apr. 22, 2022 (JP) ................................ 2022-070590

(51) Int. Cl.
*H04L 47/6275* (2022.01)
*H04L 47/28* (2022.01)
*H04L 67/12* (2022.01)

(52) U.S. Cl.
CPC .......... *H04L 47/6275* (2013.01); *H04L 47/28* (2013.01); *H04L 67/12* (2013.01)

(58) Field of Classification Search
CPC ..... H04L 12/12; H04L 47/6275; H04L 47/28; H04L 67/12
See application file for complete search history.

(56) References Cited

U.S. PATENT DOCUMENTS 9,705,699 B2 * 7/2017 Lee .................. H04L 12/40143
10,668,876 B2 6/2020 Ando et al.
(Continued)

FOREIGN PATENT DOCUMENTS

CN 113783756 A 12/2021
JP 2007-288491 A 11/2007
(Continued)

OTHER PUBLICATIONS

Japanese Office Action issued in corresponding Japanese Patent Application JP 2022-070590, dated Jul. 29, 2025 with English Translation (10 Pages).

(Continued)

*Primary Examiner* — Bailor C Hsu
(74) *Attorney, Agent, or Firm* — Foley & Lardner LLP

(57) ABSTRACT

A communication device includes a classification unit that classifies received frames into a plurality of classes, a queueing unit that buffers the frames for each of the classes, a gate unit that opens/closes the frames, a scheduling unit that determines the open/closed state and sets a guard band as a transmission inhibition period at a proximity of a gate open state end time, to ensure a transmission timing of another class, and a transmission unit that transmits the frame passed through by the gate unit. The scheduling unit sets a guard band width corresponding to a frame maximum length, and controls the open/closed state to ensure the guard band width.

14 Claims, 24 Drawing Sheets

(56) References Cited

U.S. PATENT DOCUMENTS

| | | | | |
|---|---|---|---|---|
| 10,798,117 | B2 * | 10/2020 | Haga | H04W 4/44 |
| 11,012,172 | B2 * | 5/2021 | Kaku | H04J 3/0673 |
| 11,929,878 | B2 * | 3/2024 | Fang | H04W 12/37 |
| 12,248,579 | B1 * | 3/2025 | Newman | G06F 8/65 |
| 12,652,329 | B2 * | 6/2026 | Jeon | H04L 65/75 |
| 2019/0199641 | A1 | 6/2019 | Lo Bello et al. | |
| 2021/0136182 | A1 * | 5/2021 | Jung | H04L 69/18 |

FOREIGN PATENT DOCUMENTS

| | | | |
|---|---|---|---|
| JP | 2018-070121 | A | 5/2018 |
| JP | 2019-004379 | A | 1/2019 |
| JP | 2021-034863 | A | 3/2021 |

OTHER PUBLICATIONS

Frank Durr et al., "No-wait Packet Scheduling for IEEE Time-sensitive Networks (TSN)", RTNS '16: Proceedings of the 24th International Conference on Real-Time Networks and Systems, Oct. 19, 2016, pp. 203-212, https://dl.acm.org/doi/10.1145/2997465.2997494.

International Search Report and Written Opinion with English Translations of International Patent Application No. PCT/JP2023/007357 dated Apr. 25, 2023 (9 pages).

YoungSoo Do et al., "Method and Analysis for the Improvement of Preemption Performance in IEEE 802.1 TSN", 2023 17th International Conference on Ubiquitous Information Management and Communication (IMCOM), Jan. 3, 2023, https://ieeexplore.ieee.org/document/10035664.

Japanese Office Action issued in corresponding JP Patent Application No. 2022-070590, dated May 13, 2025 with Machine translation (8 pages).

* cited by examiner

FIG. 11

45

CLASS TABLE

| FRAME DATA CONDITION | FRAME LENGTH CONDITION | CLASS |
|---|---|---|
| SA == XXX | * | 1 |
| SA == YYY | >500B | 2 |
| SA == YYY | ≤500B | 3 |
| ⋮ | ⋮ | ⋮ |

60 61 62

FIG. 12

48

SCHEDULING UNIT

70 GATE STATE TABLE

| TIME | GATE STATE |
|---|---|
| 0us | oC…C |
| 10us | Co…o |
| 100us | CC…C |
| ⋮ | ⋮ |

71 GUARD BAND TABLE

| CLASS | GUARD BAND |
|---|---|
| 1 | N/A |
| 2 | 12us (1500B) |
| 3 | 4us (500B) |
| ⋮ | ⋮ |

72 73 74 75

FIG. 15

45

CLASS TABLE

63 FRAME DATA CONDITION TABLE

| FRAME DATA CONDITION | ID-D |
|---|---|
| SA == XXX | 1 |
| SA == YYY | 2 |
| ⋮ | ⋮ |
| 60 | 66 |

64 FRAME LENGTH CONDITION TABLE

| FRAME LENGTH CONDITION | ID-L |
|---|---|
| >500B | 1 |
| ≤500B | 2 |
| ⋮ | ⋮ |
| 61 | 67 |

65 CLASS CONDITION TABLE

| ID-D | ID-L | CLASS |
|---|---|---|
| #1 | * | 1 |
| #2 | #1 | 2 |
| #2 | #2 | 3 |
| ⋮ | ⋮ | ⋮ |
| 68 | 69 | 62 |

FIG. 25

80 SETTING PRESET TABLE

| STATISTICAL INFORMATION CONDITION | CLASS TABLE SETTING | GATE STATE TABLE SETTING | GUARD BAND TABLE SETTING |
|---|---|---|---|
| AAA | SETTING 1 | SETTING 1 | SETTING 1 |
| BBB | SETTING 2 | SETTING 2 | SETTING 2 |
| CCC | SETTING 3 | SETTING 3 | SETTING 3 |
| ⋮ | ⋮ | ⋮ | ⋮ |

81 82 83 84

COMMUNICATION DEVICE AND IN-VEHICLE ELECTRONIC DEVICE

TECHNICAL FIELD

This invention relates to a communication device and an in-vehicle electronic device.

BACKGROUND ART

In an in-vehicle network as a network inside an automobile, a plurality of sensors and actuators are mutually connected to allow communication therebetween. With recent technological advances, such as Autonomous Driving (AD) and Advanced Driver Assistance System (ADAS), advances are expected in in-vehicle networks as well. One of them is use of a zonal architecture and sharing a network corresponding thereto.

The conventional in-vehicle network is configured of individual networks for respective communication targets referred to as domains, such as a power-train/chassis system, a vehicle body system, an AD/ADAS system, and an information system. These networks are configured of communication methods, such as Controller Area Network (CAN), Local Interconnect Network (LIN), FlexRay (registered trademark), or Ethernet (registered trademark), which are not compatible to one another, corresponding to the usage for each domain. However, such a network configuration individual for each domain complicates the network management, and additionally, places a burden on the automobile design in terms of wiring weight and wiring costs.

A solution to this is a zonal architecture and network sharing.

In the zonal architecture, instead of using the conventional domain-based network, spatially adjacent sensors and actuators are connected to one subnetwork. Further, the subnetworks are mutually connected by a bus common in the domains, thereby achieving the network sharing.

A problem in the network sharing is, for example, that the network to provide a communication quality that the communication application requires. For example, in the communication of the power-train/chassis system, it is required that a latency from a transmission source to a destination is short, and a data loss rate is low. Meanwhile, in the communication of the AD/ADAS system, a large-capacity communication, such as camera data, is required. In the communication of the information system, both the latency and the data loss rate are acceptable to some extent.

As a technique to solve such a problem, Time-Sensitive Network (TSN) is included. TSN is a technique based on Ethernet, in which a communication is logically divided into a plurality of classes, time synchronization is performed in a network, and a transmission control on frames is performed based on time. On the network shared thereby, the communication satisfying the quality required by the applications can be achieved.

TSN is a general term for technologies including a plurality of standard specifications, and its representative standard specification is Institute of Electrical and Electronics Engineers (IEEE) 802.1Qbv.

This is a method in which a transmission available time referred to as a time slot is periodically set for each class, and frame transmission is strictly controlled with the set transmission time. In the specification of IEEE 802.1Qbv, to avoid that a transmitted frame of one class interferes with transmission of a frame to be transmitted of another class, a guard band is specified. The guard band is set at an end of the transmission available time for each class, and transmitting a frame in transmission is permitted while starting transmission of a new frame is not permitted during the guard band period. This ensures the transmission of one class to finish within the range of the time slot, and avoids latency of the frame transmission of another class affected thereby.

However, introduction of TSN based on the specification of IEEE 802.1Qbv causes concern of reduction in communication efficiency. That is, in the standard specification, the size of the guard band is specified to be set to a maximum frame length of frames transmitted in the class. In this case, even when a frame shorter than the maximum frame length is included in the class and the frame falls within the guard band, the transmission is not permitted, and thus the communication efficiency reduces.

Patent Literature 1 discloses a technique for improving the communication efficiency in a time division network. The technique described in Patent Literature 1 includes a time scheduler, a priority class unit, a non-priority class unit, and a scheduling information changing unit.

Here, the time scheduler has a state of priority gate and a state of non-priority gate. That is, in the state of priority gate, a signal queued in the priority class unit is passed in an open state, and the passing of the signal is blocked in a closed state. On the other hand, in the state of non-priority gate, a signal queued in the non-priority class unit is passed in an open state, and the passing of the signal is blocked in a closed state.

Then, the time scheduler performs a process of controlling a timing of changing the state of the priority gate based on scheduling information. That is, the scheduling information changing unit gives an instruction to the time scheduler to change the timing of changing the state indicated by the scheduling information corresponding to the signal of the priority class.

CITATION LIST

Patent Literature

Patent Literature 1: Japanese Unexamined Patent Application Publication No. 2019-004379

SUMMARY OF INVENTION

Technical Problem

The technique described in Patent Literature 1 is effective in a case where the number of the frames in the signal of the priority class dynamically varies relative to time. However, in a control network typified by an in-vehicle network, a temporal change in a pattern of transmitted data is small in some cases. In such a case, the improved communication efficiency is not expected with the technique described in Patent Literature 1.

It is an object of the present invention to provide a communication device and an in-vehicle electronic device capable of improving a communication efficiency when applied to an in-vehicle network.

Solution to Problem

In order to solve the above problems, configurations described, for example, in the claims is adopted.

The present specification includes a plurality of means for solving the above problems, and one example is as follows.

As a communication device, a receiving unit that receives frames from an inside or an outside of a vehicle; a classification unit that classifies the frames received by the receiving unit into at least two or more classes corresponding to information included in the frames; a queueing unit that buffers the frames for each of the classes classified by the classification unit; a gate unit that causes the frames queued by the queueing unit to pass through in a gate open state and blocks the passing in a gate closed state; a scheduling unit that determines the open/closed state of the gate unit and sets a guard band as a transmission inhibition period at a proximity of an end time of the gate open state of the class, to ensure a data transmission timing of another class; and a transmission unit that transmits the frames passed through by the gate unit are provided.

Here, the classification unit includes: a frame data classification unit that classifies the frames for each data condition of the frames; a frame length classification unit that classifies the frames based on a frame length of the frame; a class table that holds the data condition and a frame length condition of the frames and class data allocated based on the data condition and the frame length condition as classification criteria in the frame data classification unit and the frame length classification unit; and a classification execution unit that classifies the frames based on determination of the class of the frame by the class table. The scheduling unit sets a guard band width correspond to a frame maximum length of each class specified in the class table, and the gate unit controls the open/closed state to ensure the guard band width determined for each of the classes.

Advantageous Effects of Invention

According to the present invention, transmission efficiency of the network is improved even in the use of the guard band, and the process load on the communication device can be averaged.

Objects, configurations, and effects other than the above will be apparent from the description of the following embodiments.

BRIEF DESCRIPTION OF DRAWINGS

FIG. 11 is a drawing illustrating a configuration of a class table according to the first embodiment of the present invention.

FIG. 12 is a drawing illustrating a configuration of a scheduling unit according to the first embodiment of the present invention.

FIG. 15 is a drawing illustrating a configuration of a class table according to a second embodiment of the present invention.

FIG. 25 is a drawing illustrating an example of a configuration of a setting preset table according to a fourth embodiment of the present invention.

DESCRIPTION OF EMBODIMENTS

First Embodiment

One embodiment of the invention will now be described with reference to FIG. 1 to FIG. 14.

Figure 1:
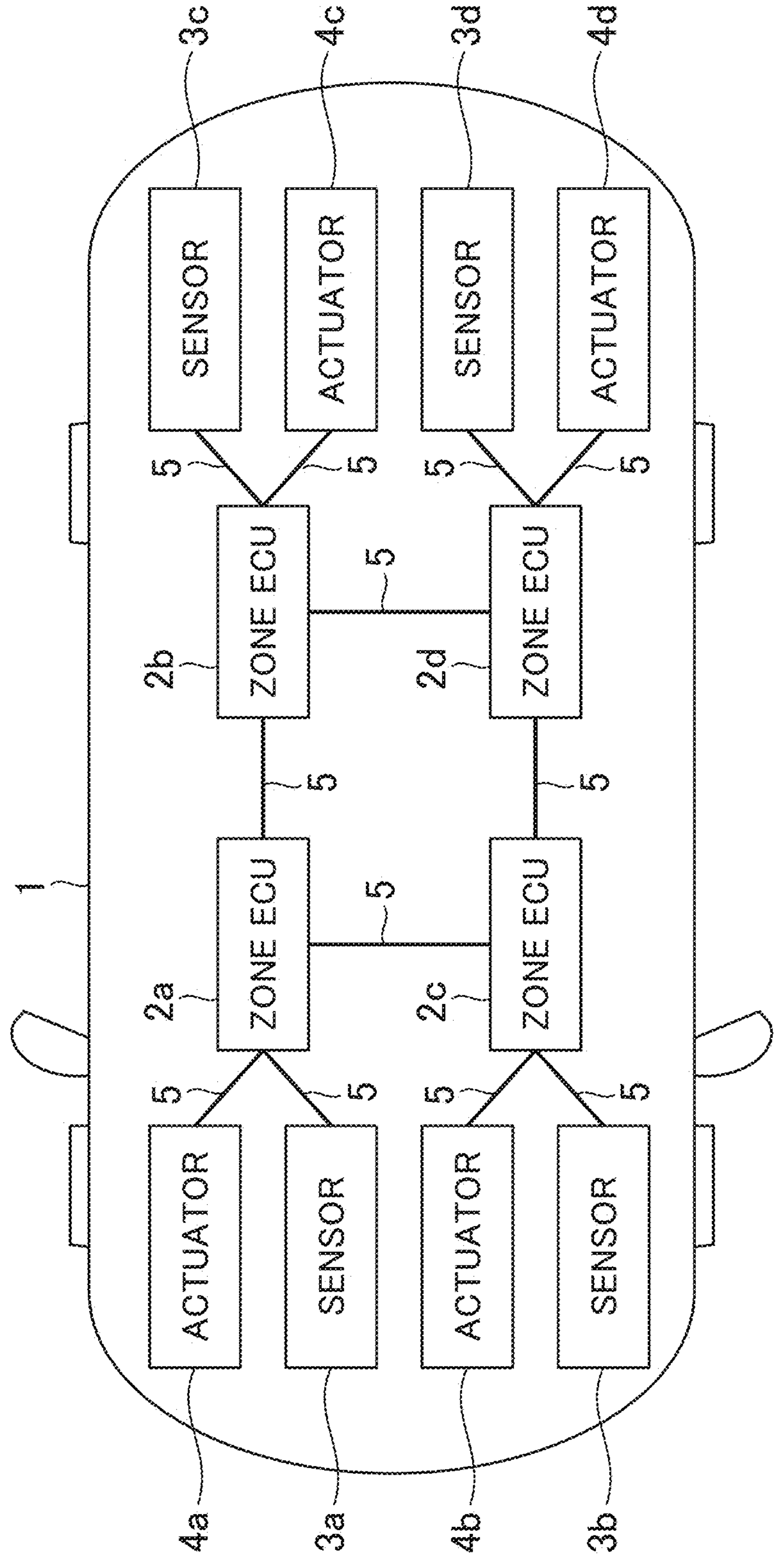
FIG. 1 is a drawing illustrating a network configuration of a communication device according to a first embodiment of the present invention.

FIG. 1 illustrates a communication network connection inside a vehicle on which a communication device according to embodiments of the present invention is mounted.

FIG. 1 illustrates an example of a zonal architecture employed as a network inside a vehicle 1.

The network includes zone Electronic Control Units (ECUs) 2*a* to 2*d*, sensors 3*a* to 3*d* connected to the zone ECUs 2*a* to 2*d*, and actuators 4*a* to 4*d* connected to the zone ECUs 2*a* to 2*d* and the like.

The numbers of the zone ECUs 2*a* to 2*d*, the sensors 3*a* to 3*d*, and the actuators 4*a* to 4*d* illustrated in FIG. 1 are one example, and one or a plurality of the zone ECUs, the sensors, and the actuators are provided.

In the following description, the zone ECUs 2*a* to 2*d*, the sensors 3*a* to 3*d*, and the actuators 4*a* to 4*d* are referred to as a zone ECU 2, a sensor 3, and an actuator 4 excluding a case where they need to be individually distinguished.

The zone ECU 2, as its name suggests, is disposed corresponding to a position (zone) of front, rear, left, right, and the like in the vehicle, and connected to the sensor 3 or the actuator 4, or both of them close to the installation position thereof. The zone ECU 2 is connected to other zone ECUs 2 by a shared bus 5 using a common communication method. At least a part of the sensors 3 or the actuators 4 may be connected to the zone ECU 2 by the shared bus 5.

The communication device described in this embodiment is implemented to the zone ECU 2. In the following description, the zone ECU is referred to as a communication device.

Figure 2:
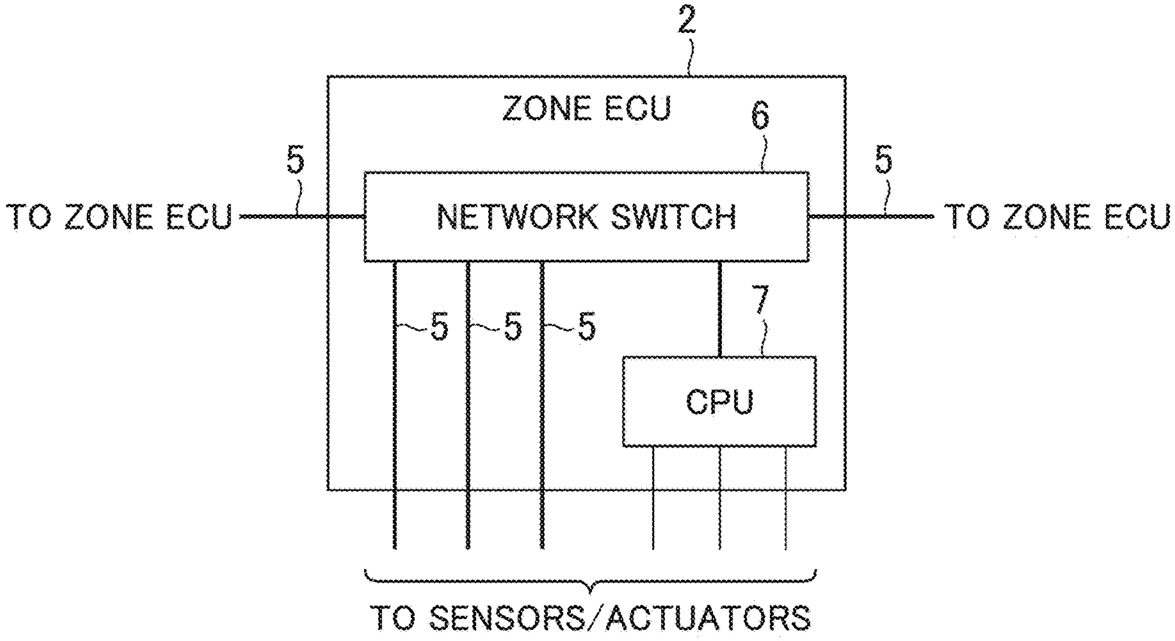
FIG. 2 is a drawing illustrating a hardware configuration of the communication device according to the first embodiment of the present invention.

FIG. 2 illustrates a hardware configuration of a communication device 2.

The communication device 2 includes a network switch 6 to be connected to another communication device 2, or to be connected to the sensor 3 and the actuator 4. The communication device 2 includes a Central Processing Unit (CPU) 7 to process information received from the sensor 3, the actuator 4, or the shared bus 5, and the CPU 7 is connected to the network switch 6.

Parts indicated by bold lines among the lines connecting the respective units in FIG. 2 indicate the shared buses 5 that performs the communication by a common communication method as a connection method between the communication devices 2 in the zonal architecture. Parts indicated by thin lines connecting the respective units in FIG. 2 indicate that the communication is performed by a communication method other than the common communication method.

When the sensor 3 and the actuator 4 are compatible to the common communication method, the sensor 3 and the actuator 4 are directly connected to the network switch 6. When the sensor 3 and the actuator 4 are not compatible to the common communication method, the sensor 3 and the actuator 4 can be connected to the CPU 7 and converted to the common communication method inside the CPU 7.

While the common communication method premises Ethernet (registered trademark), another method may be employed insofar as the function similar to that of TSN is provided. For the connection between the network switch 6 and another CPU 7, Ethernet can be used, and another method also can be used. The communication method other than the common communication method includes CAN, LIN, FlexRay, and the like.

The communication device 2 receives data from the sensor 3 and the actuator 4. The communication device 2 receives data generated by the CPU 7. These pieces of the data are processed by the CPU 7, or transmitted the other communication device 2. Further, the communication device 2 receives data from the other communication device 2 connected by the shared bus 5. The received data is processed by the CPU 7 as necessary, and then forwarded to the sensor 3 or the actuator 4.

In the zonal architecture, one communication device 2 houses various sensors 3 and actuators 4.

Examples of an ECU that manages engine control and steering control includes an ECU of Power-train/Chassis (PT/CH) system. Examples of an ECU that processes information acquired from an external sensor, such as a camera and a radar, to perform automatic driving and safe driving assistance for a driver includes an ECU of Autonomous Driving/Advanced Driver Assistance System (AD/ADAS). Furthermore, an ECU of BODY system that controls power window and air conditioner, an ECU of INFO system that performs audio/video distribution and Internet access, and the like are included.

Figure 3:
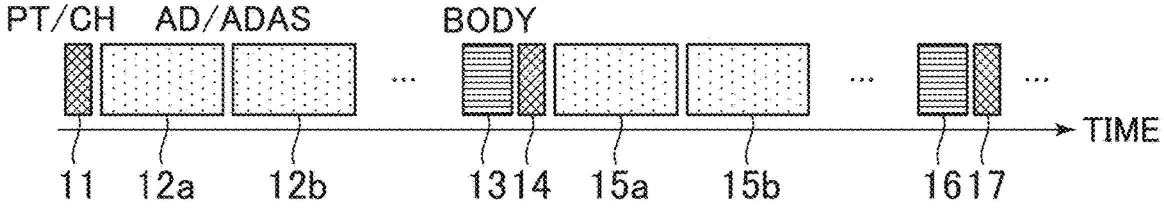
FIG. 3 is a schematic diagram of a communication frame in a zonal architecture according to the first embodiment of the present invention.

FIG. 3 is a schematic diagram of a communication frame on the shared bus 5 in the zonal architecture.

PT/CH system data 11, 14, 17, AD/ADAS system data 12*a*, 12*b*, 15*a*, 15*b*, and BODY system data 13, 16 are periodically transmitted. These pieces of data are different in communication requirements, such as a communication cycle, a frame size, a required latency, and a frame loss tolerance. Therefore, only the communication simply performed by shared network does not satisfy the communication requirements, and makes vehicle control unstable in some cases.

In such a communication environment, as a method in which a plurality of communications different in communication requirement are separated to enable communication controls appropriate for the respective communications, thereby improving safety, Time-Sensitive Network (TSN) is standardized. While TSN includes a plurality of specifications, here, a communication control based on IEEE 802.1Qbv specification described in Background Art is assumed. IEEE 802.1Qbv is also referred to as Time-Aware Shaper, and is a method in which communication frames are classified into a plurality of classes, a transmission available time referred to as a time slot is set to perform time division communication for each class, thereby separating communications.

Figure 4:
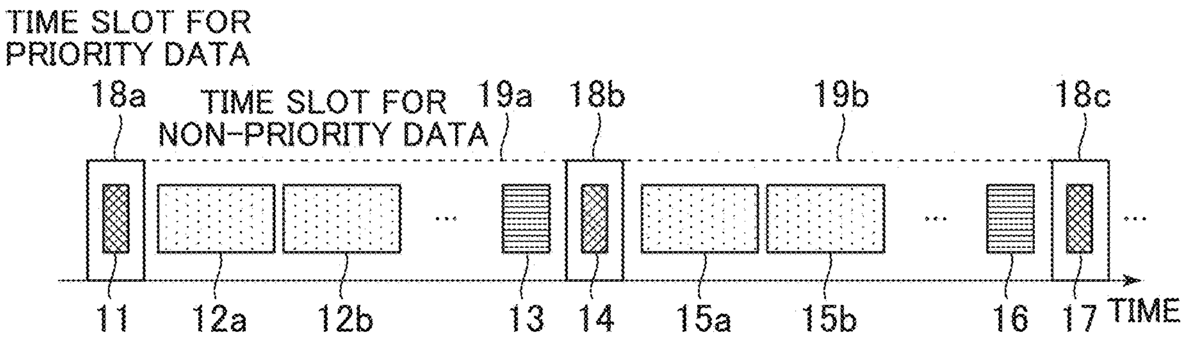
FIG. 4 is a schematic diagram of time slot setting (Example 1) in IEEE 802.1Qbv.

An example of a communication by IEEE 802.1Qbv is illustrated in FIG. 4.

In the example of FIG. 4, communications are classified into a priority class and a non-priority class, and the transmission available time referred to as a time slot is determined for each classification. That is, time slots 18*a* to 18*c* for priority data and time slots 19*a*, 19*b* for non-priority data are set.

While the classification of communications into priority and non-priority can be appropriately set by the designer, here, the PT/CH system data having a large degree of influence on the vehicle control is set to priority class data 11, 14, 17, and the AD/ADAS system data 12, 12*b*, 15*a*, 15*b*, the BODY system data 13, 16, and INFO data (not illustrated) other than it are set to non-priority class data. Also in the case of this embodiment, the PT/CH system data having a large degree of influence on the vehicle control is set to priority class data, and the AD/ADAS system data, the BODY system data, and the INFO data other than it are set to the non-priority class data. Thus, the priority of communications is properly set.

In the simple time division communication as illustrated in FIG. 4, the non-priority class affects the transmission time of the priority class in some cases.

Figure 5:
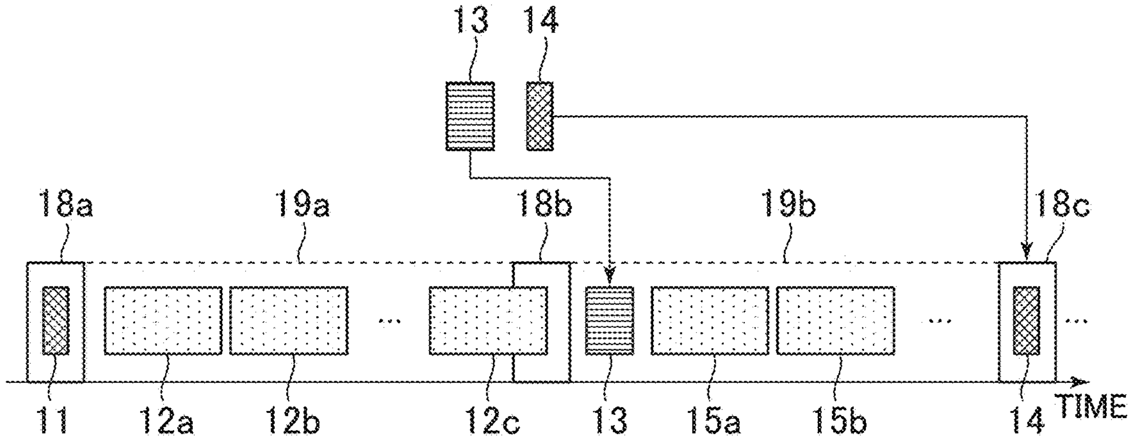
FIG. 5 is a schematic diagram of time slot setting (Example 2) in IEEE 802.1Qbv.

FIG. 5 illustrates an example of this case. Here, assume that the transmission time of AD/ADAS system data 12 is delayed for some reason. While the last AD/ADAS system data 12*c* in the time slot 19*a* for the non-priority class is included in the time slot 19*a* at a transmission starting time thereof, the last AD/ADAS system data 12*c* exceeds the time slot 19*a* at a transmission completion time, and enters the next time slot 18*b* of the priority class.

In this case, the transmission of the data 14 of the priority class is delayed, or in the worst case, the data 14 needs to be transmitted at the further next time slot 18*c*. Therefore, a required value of latency cannot be satisfied, possibly causing an important influence on the vehicle control.

To avoid such a situation, IEEE 802.1Qbv employs a method referred to as a guard band. The guard band is set at an end of each time slot. In the guard band, while continue of transmission of a frame in transmission is permitted, starting transmission of a new frame (untransmitted frame) is inhibited. By setting a width of the guard band to a maximum frame length of the frames included in the class, entering to the subsequent time slot can be avoided.

Figure 6:
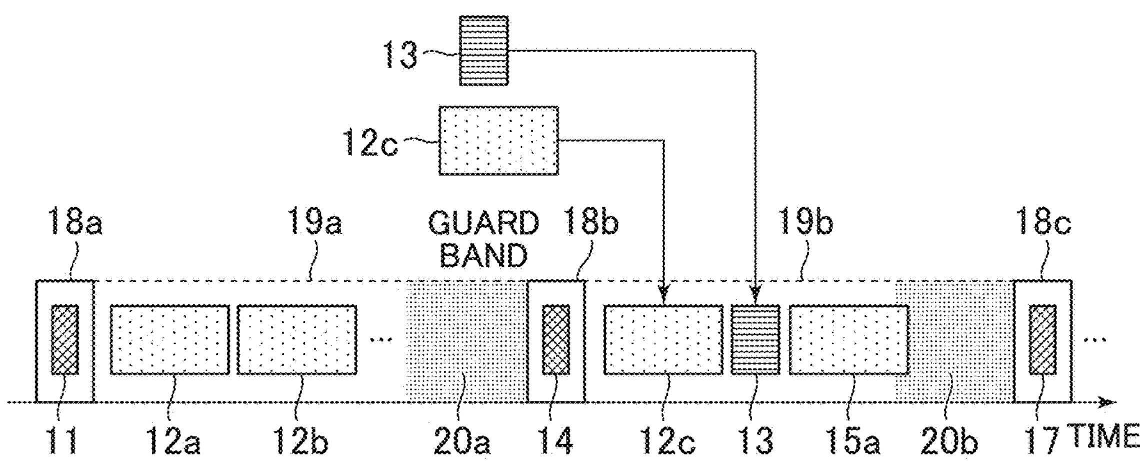
FIG. 6 is a schematic diagram of time slot setting (Example 3) in IEEE 802.1Qbv.

FIG. 6 illustrates a state of the guard band. At the ends of the non-priority time slots 19*a*, 19*b*, guard bands 20*a*, 20*b* are set, respectively. Here, the last frame 12*c* of the AD/ADAS system data 12 planned to be transmitted at a timing similar to that in the example of FIG. 5 has a transmission starting time in the guard band 20*a*, and therefore, the transmission is inhibited. Therefore, the subsequent PT/CH system data 14 can be transmitted in the planned time slot 18*b*, and the latency requirements can be satisfied. The last frame 12*c* of the AD/ADAS system data 12 is transmitted in the next time slot 19*b* for non-priority data.

Meanwhile, protection of the other class by the guard band is achieved with a sacrifice. That is, since the guard band is set corresponding to the maximum frame length in the class, even when a transmission request of a shorter frame is made, the transmission is inhibited.

For example, in the example of FIG. 6, while the BODY system data frame 13 is received at the same timing and waits for transmission, since the transmission starting time is in the guard band 20*a*, the BODY system data frame 13 is not transmitted. However, the BODY system data frame 13 is sufficiently short, and the transmission is completed before the next time slot 18*b* for priority class. Therefore, the frame is not transmitted in the guard band 20*a*.

As described above, the use of the guard band causes a useless period in which the communication is not performed. At the same time, frames are accumulated at a queue in the communication device, and the transmission is waited until the next time slot for low priority class. Due to this operation, the queue is filled with the data, possibly causing a frame loss, and additionally, since many frames are transmitted in the next time slot for low priority class, a load on the communication device increases.

Therefore, in this embodiment, a transmission opportunity of the frame having the short frame length is increased, thereby attempting improvement of the communication efficiency, reduction of the frame loss, and reduction of the load on the communication device.

Figure 7:
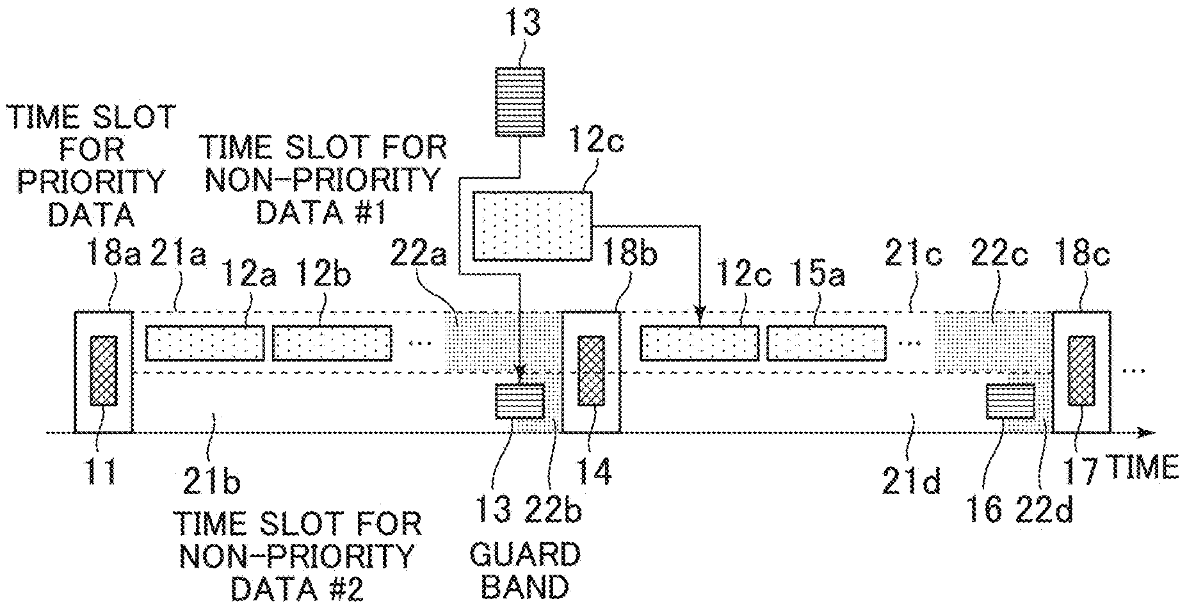
FIG. 7 is a schematic diagram of time slot setting according to the first embodiment of the present invention.

Specifically, as illustrated in FIG. 7, the low priority class is divided into two or more subclasses sharing time slots 21*a*, 21*b*, and the frames of the low priority class are classified into the subclasses depending on the frame length.

Since the maximum frame length is determined for each subclass, guard bands 22*a*, 22*b* corresponding to the maximum frame lengths can be set for the respective subclasses. For example, assume that the AD/ADAS system data 12 having the long frame length is classified into a subclass 1, and the BODY system data 13 having the short frame length is classified into a subclass 2. Even in the guard band 22*a* of the subclass 1, the subclass 2 can transmit the frame 13 that is not in the guard band 22*b* and belongs to the subclass 2. In the following description, the subclasses of the priority class and the low priority class are collectively referred to as a class.

The guard bands 22*a*, 22*b* here are, as described in FIG. 5, provided to permit continuing transmission of a frame in transmission and inhibit starting transmission of a new untransmitted frame.

Figure 8:
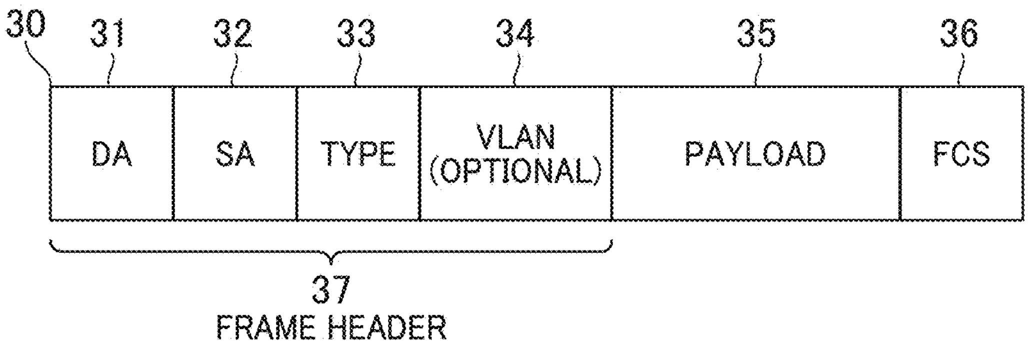
FIG. 8 is a drawing illustrating a frame structure (Example 1) handled by the communication device according to the first embodiment of the present invention.

FIG. 8 is a drawing illustrating an example of a frame structure in this embodiment. In this embodiment, Ethernet frame is applied. The communication device 2 transmits and receives a frame 30 illustrated in FIG. 8. The frame 30 includes a Destination Address (DA) 31, a Source Address (SA) 32, a type 33, a payload 35, and a Frame Check Sequence (FCS) 36. Further, a Virtual Local Area Network (VLAN) tag 34 that is a code for logically dividing a network may be included. A portion from the destination address 31 to the VLAN tag 34 is referred to as a frame header 37.

The communication device 2 can add additional information to the frame.

Figure 9:
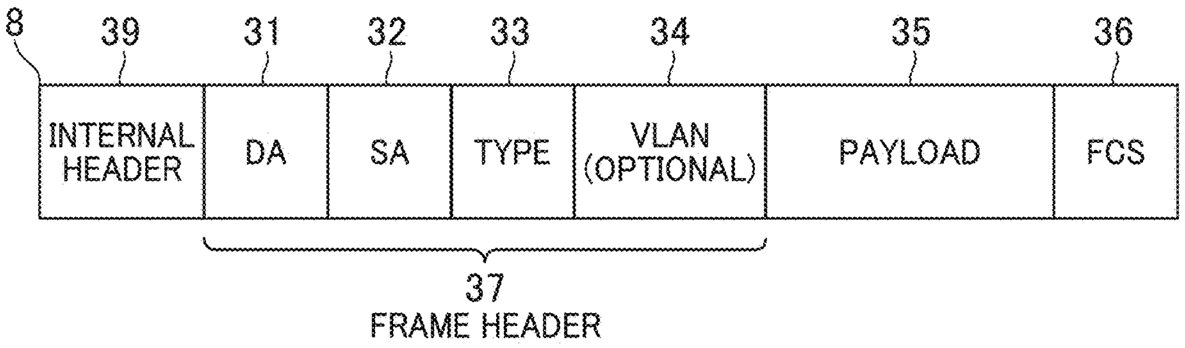
FIG. 9 is a drawing illustrating a frame structure (Example 2) handled by the communication device according to the first embodiment of the present invention.

FIG. 9 illustrates an example of a frame structure when additional information is added to the frame. Here, the additional information is added at the front of a frame 38 as an internal header 39. Examples of the additional information includes a receiving port number, a destination port number, and a class number.

Figure 10:
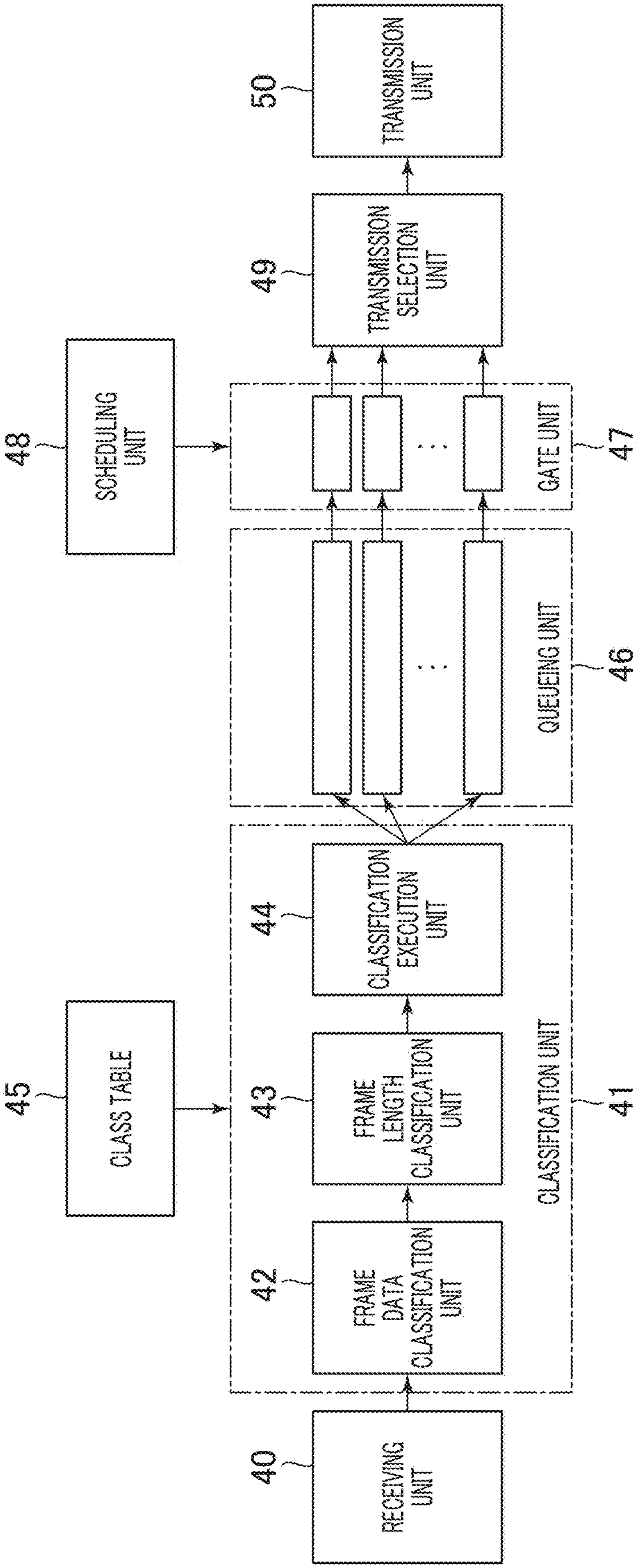
FIG. 10 is a block diagram illustrating a configuration of the communication device according to the first embodiment of the present invention.

FIG. 10 is a block diagram of the communication device 2.

The communication device 2 receives frames from the inside or the outside of the communication device 2 by a receiving unit 40. The frames received by the receiving unit 40 are classified into classes corresponding to information included in the frames by a classification unit 41. Subsequently, a queueing unit 46 buffers the frames of each class classified by the classification unit 41. Subsequently, a gate unit 47 causes the frames queued in the queueing unit 46 to pass through in a gate open state, and blocks the passing in a gate closed state. The open/closed state of the gate unit 47 is controlled by a scheduling unit 48. The scheduling unit 48 determines a control timing of the gate unit 47, and sets the guard band as a transmission inhibition period at the proximity of a gate open state end time of each class, thereby ensuring a data transmission timing of other classes. Consequently, the guard band effectively functions.

Further, when a plurality of gates of the gate unit 47 simultaneously become the open state, and a plurality of frames are to be output, a transmission selection unit 49 performs a determination process of a transmission priority order to select one of the plurality of frames and sequentially select the frame to be transmitted.

Consequently, the frames classified by the classification unit 41 are transmitted at the transmission timings determined by the scheduling unit 48.

The frame selected by the transmission selection unit 49 is transmitted by a transmission unit 50. These configurations are implemented mainly to the network switch 6 (FIG. 2).

The classification unit 41 includes a frame data classification unit 42, a frame length classification unit 43, a class table 45, and a classification execution unit 44. The frame data classification unit 42 classifies the frames into at least two groups for each of data conditions of the frames.

The frame length classification unit 43 classifies the frames into at least two groups based on frame lengths of the frames. Classification criteria in the frame data classification unit 42 and the frame length classification unit 43 include the data condition of the frame and the frame length condition.

Class data assigned based on the data condition of the frame and the frame length condition is held by the class table 45.

The classification execution unit 44 classifies the frames into any of the queueing units 46 based on the determination of the classes of the frames by the class table 45.

The gate unit 47 holds the gates for the respective classes, and connects the gates to corresponding respective queues of the queueing unit 46. For example, when the number of the classes is two, the queueing unit 46 has two queues for the respective classes, the gate unit 47 has two gates for the respective classes, and the queue is connected to the gate of the same class.

The gate unit 47 controls opening/closing the gate for each class based on information of the scheduling unit 48. Consequently, while the setting of the guard band of each class is strictly kept, transmission of the frames of each class is properly controlled.

FIG. 11 illustrates an exemplary class table 45 in this embodiment.

The class table 45 holds a frame data condition 60, a frame length condition 61, and a classification destination class 62. The frame data condition 60 holds the data conditions of the frames to be classified into the classes. For example, the frame data condition 60 is set as a condition of a value of a specific field of the frame header 37, a value of a specific position (a value of at least a part) of the frame payload 35, or a combination thereof. Consequently, the data conditions of the frames can be properly set.

As the frame length condition 61, conditions of the frame length to be classified into the classes are set. For example, as the frame length condition 61, conditions of the frame length, for example, larger than, smaller than, or equal to a specific value, are set. A classification destination class 62 of the frame is specified as a combination of these frame data condition 60 and frame length condition 61.

In FIG. 11, as the frame data condition 60, when the source address (SA) 31 is XXX, a class 1 is set, and when the source address (SA) 31 is YYY, a class 2 or 3 is set. Further, based on the frame length condition 61, when the source address 31 is YYY and the frame length is larger than 500B, the class 2 is set, and when the source address 31 is YYY and the frame length is 500B or less, the class 3 is set.

The scheduling unit 48 sets a guard band width corresponding to a frame maximum length for each class 62 specified in the class table 45, and the gate unit 47 controls the open/closed state of the gate to ensure the guard band width determined for each class.

FIG. 12 illustrates a configuration of the scheduling unit 48. The scheduling unit 48 holds a gate state table 70 for controlling the open/close state of the gates corresponding to the respective classes at each of periodical times, and a guard band table 71 for setting the guard band widths of the respective classes. The gate state table 70 holds a gate open/closed state 73 relative to a time 72.

The gate open/closed state 73 of the gate state table 70 holds data indicating the change of the gate state for each of the times. For example, "o" indicates the gate open state (Open), and "C" indicates the gate closed state (Close). The number of the held "o" or "C" is the same as the number of the classes. The order is any order insofar as the class IDs correspond to the gates, and for example, the order is held in an ascending order of the class ID. As an example of gate state data, when only the class 1 is open and the class 2 and the following classes are closed, the gate state data is "oC . . . C," when only the class 1 is closed and the class 2 and the following classes are open, the gate state data is "Co . . . o," and when all the classes are closed, the gate state data is "CC . . . C."

The guard band table 71 holds a guard band width 75 for each class 74. In this embodiment, the guard band table 71 is set to be matched with the maximum frame length specified by the frame length condition 61 of the class table 45.

Thus, by setting the guard band table 71 to be matched with the maximum frame length specified by the frame length condition 61 of the class table 45, the guard band can be properly set.

Figure 13:
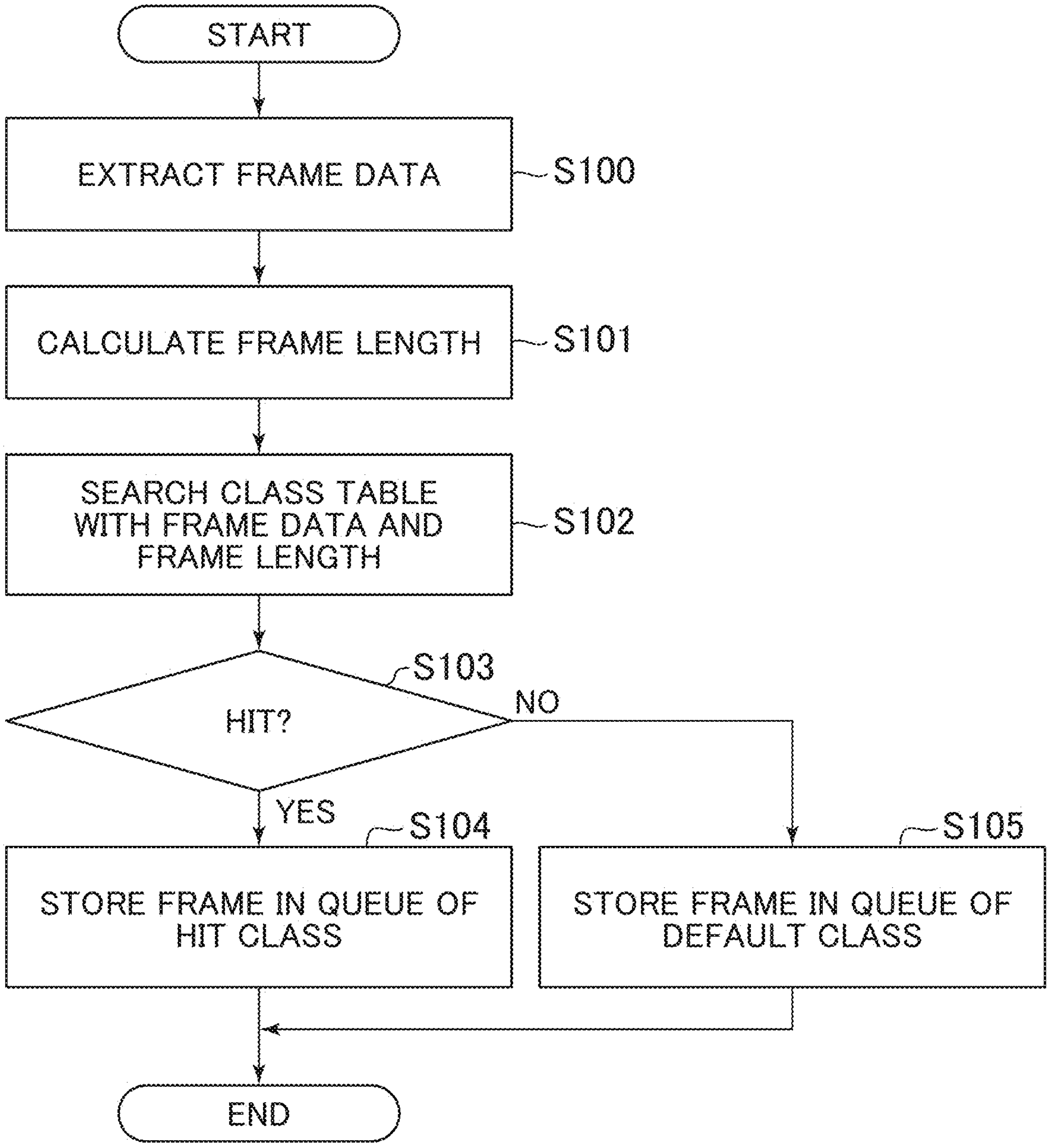
FIG. 13 is a flowchart illustrating a process of a classification unit according to the first embodiment of the present invention.

FIG. 13 is a flowchart illustrating a classification process performed by the classification unit 41.

The classification unit 41 uses the frame data classification unit 42 to process the frame received from the receiving unit 40 to extract frame data, and inputs the frame data to the frame data condition 60 of the class table 45 (Step S100). Here the frame data means the frame header and the payload.

Subsequently, the frame length classification unit 43 calculates a frame length, and inputs the frame length to the frame length condition 61 of the class table 45 (Step S101). By the input from the frame data classification unit 42 and the frame length classification unit 43, the class table 45 searches for an entry thereof (Step S102). The class table 45 determines whether or not the search hits (Step S103).

When the search hits in Step S103, a corresponding class ID 62 is returned. When the search does not hit, an error is returned, or a default class ID is returned.

When the result is hit (YES in Step S103), the classification execution unit 44 stores the frame in a queue corresponding to the hit class ID among the queues of the queueing unit 46 (Step S104). When the result is not hit (NO in Step S103), the classification execution unit 44 stores the frame in a queue corresponding to the default class (Step S105).

Figure 14:
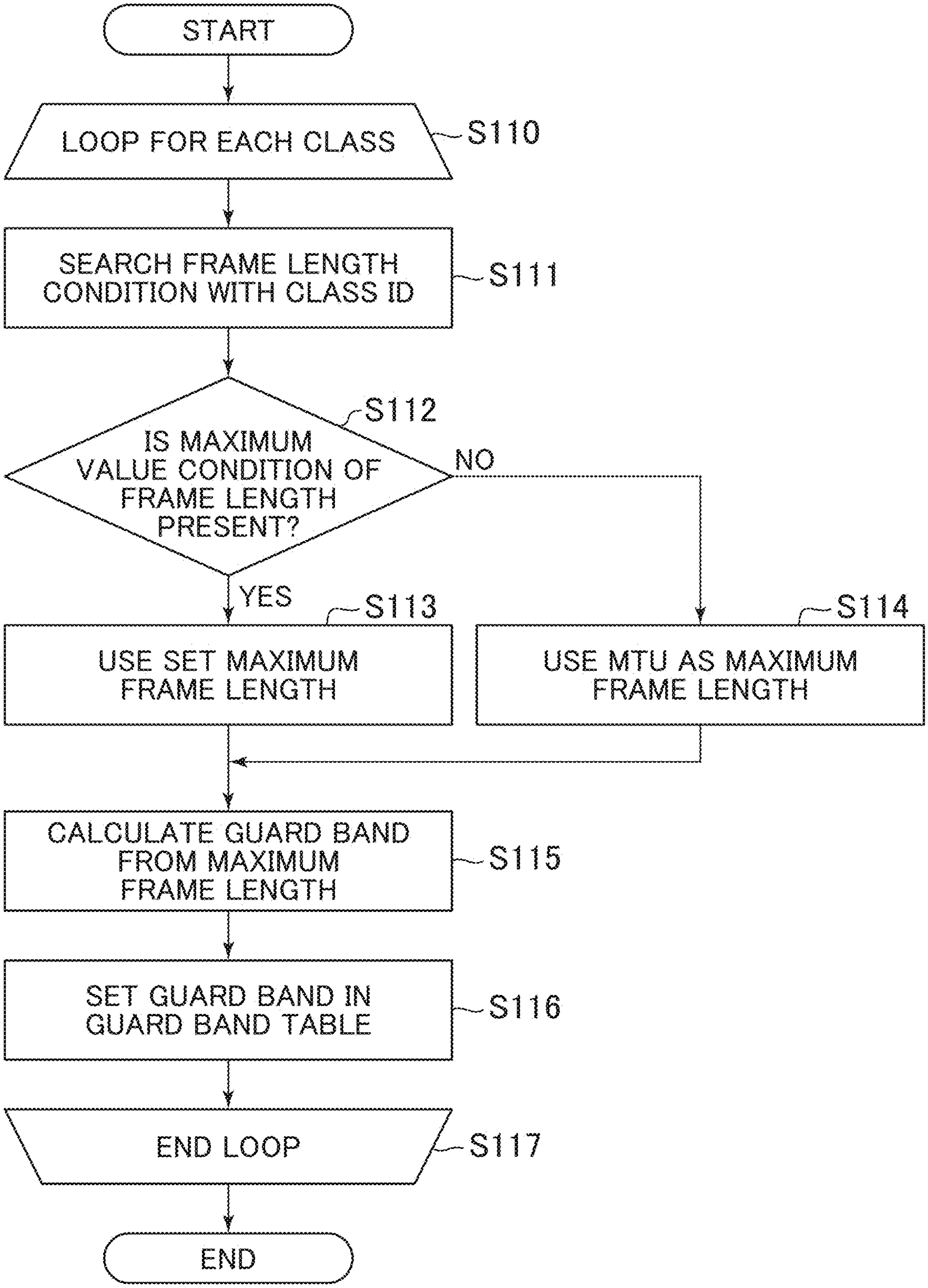
FIG. 14 is a flowchart for setting a guard band table according to the first embodiment of the present invention.

FIG. 14 is a flowchart illustrating a process of setting the guard band table 71 by the scheduling unit 48. When the scheduling unit 48 sets the guard band table 71, a process below is repeatedly performed by the number of the classes (Step S110). First, the scheduling unit 48 searches the frame length condition of the class table with the class ID (Step S111). By the search of the frame length condition, the scheduling unit 48 determines whether or not a setting specifying the maximum value of the frame length is present (Step S112).

When the setting specifying the maximum value of the frame length is present in Step S112 (YES in Step S112), the scheduling unit 48 acquires the set maximum frame length (Step S113). When the setting specifying the maximum value of the frame length is not present in Step S112 (NO in Step S112), the scheduling unit 48 uses Maximum Transmission Unit (MTU) as the maximum frame length (Step S114).

Subsequently, the scheduling unit 48 calculates a duration of the maximum frame from the maximum frame length, thereby obtaining the guard band (Step S115). At last, the scheduling unit 48 sets the guard band to a corresponding class in the guard band table (Step S116). The above-described process is performed on all the classes, and the loop is ended (Step S117). For example, since the maximum frame length (500 Byte) is set to the class 3 in the class table, the class 3 is set to 4 μs (in the case of 1 Gbps, the same applies below) corresponding to the length. For the class 2, since the condition of the maximum frame length is not present, a value of MTU common to the whole in-vehicle network is used. When it is 1500 Byte, 12 us is set in the guard band table corresponding thereto.

As described above, according to this embodiment, as illustrated in FIG. 7, since the maximum frame length is determined for each of the subclasses, the guard bands 22*a*, 22*b* corresponding to the maximum frame length can be set for each of the subclasses. Accordingly, the transmission opportunity of the frame having the short frame length can be increased, thereby allowing the attempt of improving the communication efficiency, reducing the frame loss, and reducing the load on the communication device.

While the example of the application to a vehicle employing the zonal architecture is described in this embodiment, application to a domain-specific architecture constituting a network in which the architecture is hierarchized for each major function of vehicle control provides the effect when data having different priorities is mixed.

As an application example of the network, the application to an in-vehicle network by an in-vehicle electronic device, such as a communication device 2, is an example, and this embodiment can be applied to any network including a control network of a plant and the like and a telecommunications carrier network.

Second Embodiment

Next, with reference to FIG. 15 to FIG. 18, the second embodiment of the present invention will be described. In FIG. 15 to FIG. 18 illustrating the second embodiment, the same reference numerals are attached to parts corresponding to FIG. 1 to FIG. 14 described in the first embodiment.

In the second embodiment of the present invention, holding the data of the class table 45 and the classification process operation of the classification unit 41 are changed from those in the first embodiment. Other configurations and processes are the same as the configurations and the processes in the first embodiment, and therefore, the explanation is omitted.

FIG. 15 is a drawing illustrating a configuration of the class table 45 in this embodiment.

In this embodiment, the class table 45 is achieved as three sub tables.

A first sub table is a frame data condition table 63, and holds the frame data condition 60 and a data condition ID (ID-D) 66.

A second sub table is a frame length condition table 64, and holds the frame length condition 61 and a frame condition ID (ID-L) 67.

A third sub table is a class condition table 65, and holds a frame data condition ID (ID-D) 68, a frame length condition ID (ID-L) 69, and a class ID 62 corresponding thereto.

While the configuration of the classification unit is same as that of the first embodiment, respective connection destinations and operations are different.

The frame data classification unit 42 is connected to the frame data condition table 63. The frame length classification unit 43 is connected to the frame length condition table 64. The classification execution unit 44 is connected to the class condition table 65.

Figure 16:
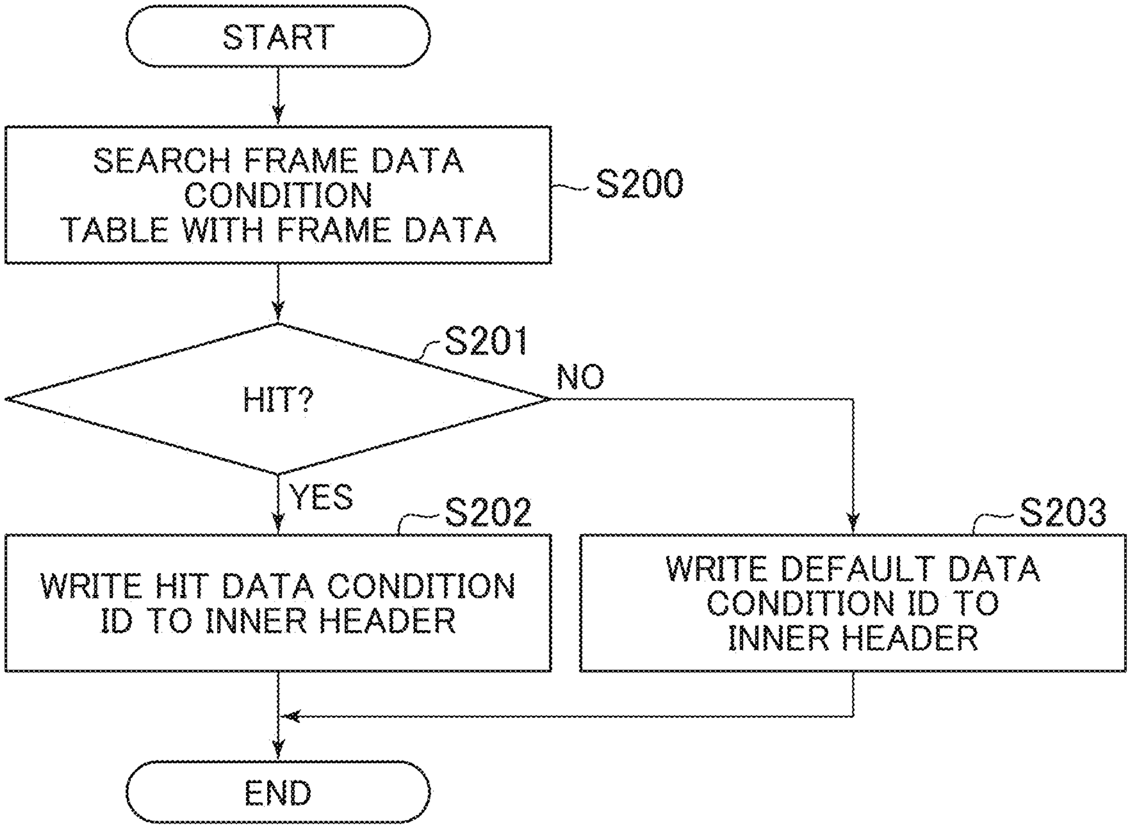
FIG. 16 is a flowchart illustrating a process of a frame data classification unit according to the second embodiment of the present invention.

FIG. 16 is a flowchart illustrating an operation process of the frame data classification unit 42.

First, the frame data classification unit 42 searches the frame data condition table 63 using the frame data (Step S200), and determines whether or not the search hits (Step S201). When the search hits in Step S201 (YES in Step S201), the frame data classification unit 42 acquires the data condition ID, and writes the acquired data condition ID to an internal header 37 (Step S202). When the search does not hit in Step S201 (NO in Step S201), the frame data classification unit 42 writes a default data condition ID to the internal header 37 (Step S203).

Figure 17:
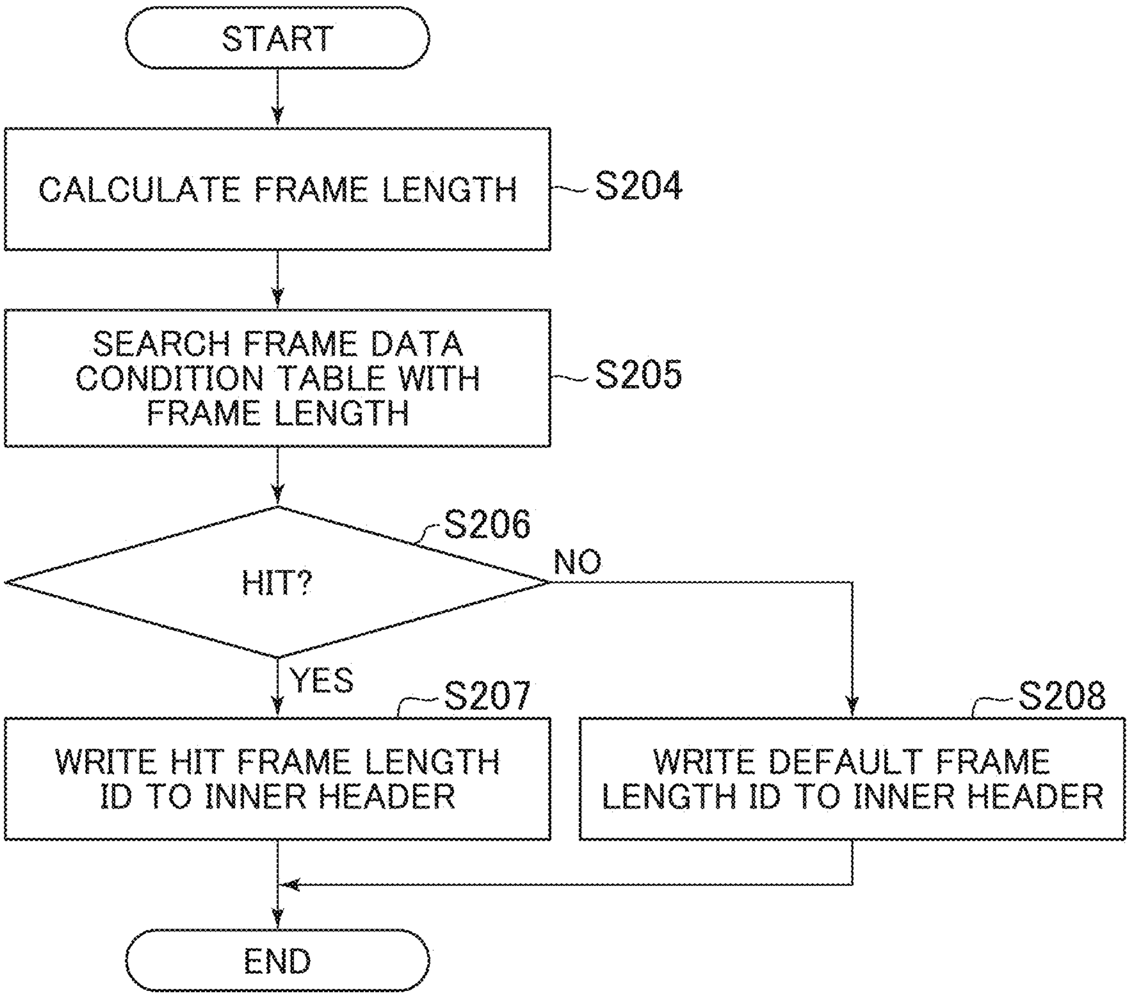
FIG. 17 is a flowchart illustrating a process of a frame length classification unit according to the second embodiment of the present invention.

FIG. 17 is a flowchart illustrating an operation process of the frame length classification unit 43.

The frame length classification unit 43 calculates the frame length (Step S204). Then, the frame length classification unit 43 searches the frame length condition table 64 with the frame length (Step S205), and determines whether or not the search hits (Step S206). When the search hits in Step S206 (YES in Step S206), the frame length classification unit 43 writes the frame length ID to the internal header 37 (Step S207). When the search does not hit in Step S206 (NO in Step S206), the frame length classification unit 43 writes a default frame length ID to the internal header 37 (Step S208).

Figure 18:
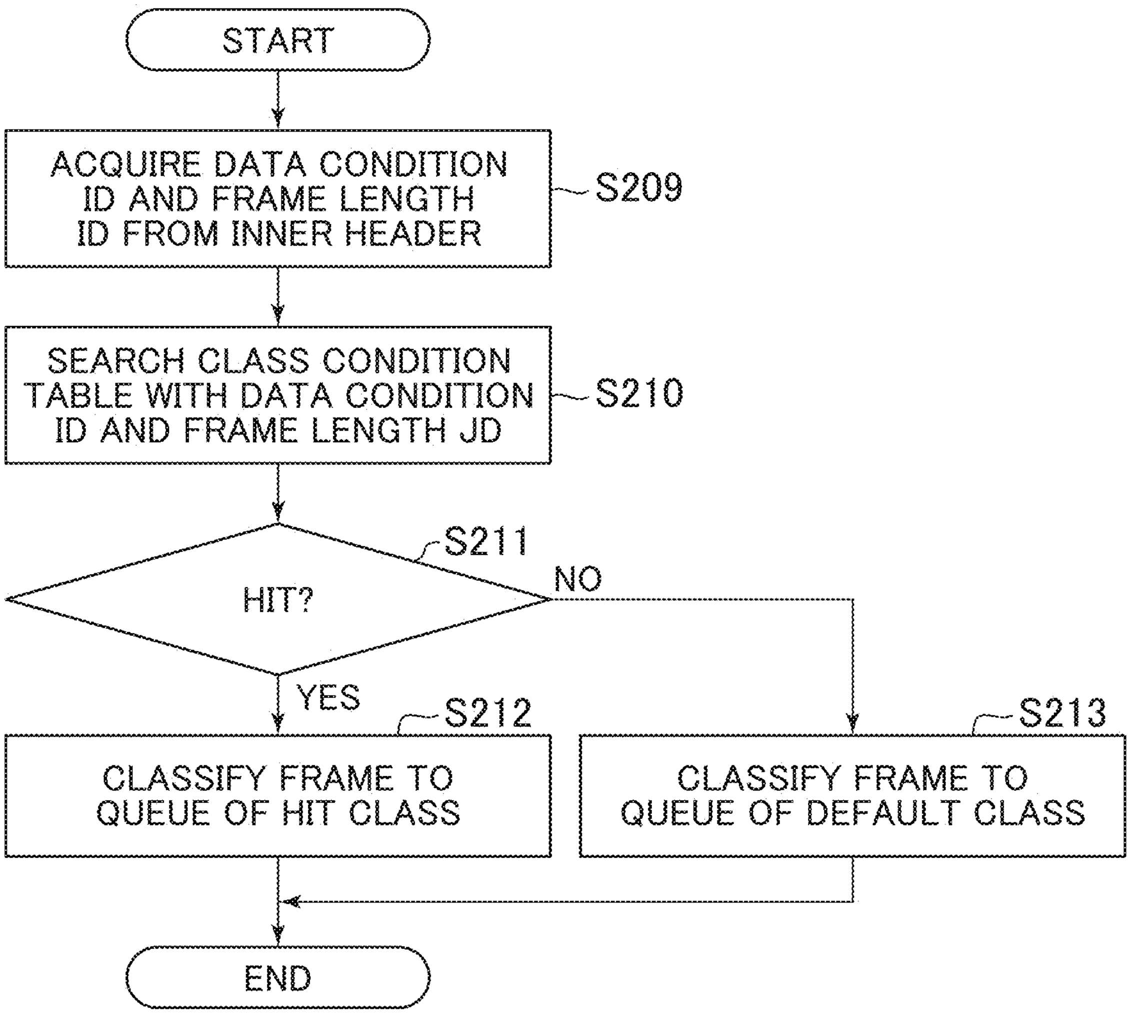
FIG. 18 is a flowchart illustrating a process of a classification execution unit according to the second embodiment of the present invention.

FIG. 18 is a flowchart illustrating an operation process of the classification execution unit 44.

The classification execution unit 44 acquires the data condition ID 66 and the frame length ID 67 from the internal header 37 (Step S209). Then, the classification execution unit 44 searches the class condition table with the acquired data condition ID 66 and frame length ID 67 (Step S210), and determines whether or not the search hits (Step S211). When the search hits in Step S211 (YES in Step S211), the classification execution unit 44 acquires the class ID, and classifies the frame into a queue corresponding to the class ID (Step S212). When the search does not hit in Step S211 (NO in Step S21), the classification execution unit 44 classifies the frame into a default queue (Step S213).

Third Embodiment

Next, with reference to FIG. 19 to FIG. 24, the third embodiment of the present invention will be described. In FIG. 19 to FIG. 24 illustrating the third embodiment, the same reference numerals are attached to parts corresponding to FIG. 1 to FIG. 18 described in the first and the second embodiments.

In the third embodiment of the present invention, to further improve the communication efficiency, the class table 45 and the scheduling unit 48 are configured to be dynamically changed corresponding to the operating status of the communication device 2. Other configurations and processes are the same as the configurations and the processes in the first and the second embodiments, and therefore, the explanation is omitted.

As the change of the class table 45 and the scheduling unit 48, for example, for the two or more classes classified by the frame length condition, by dynamically changing the frame length condition, the communication efficiency can be improved corresponding to the state of network. That is, when there are many frames inhibited to be transmitted by the guard band as a result of the class classification by the frame length condition, the improved communication efficiency can be expected by further dividing the class.

Figure 19:
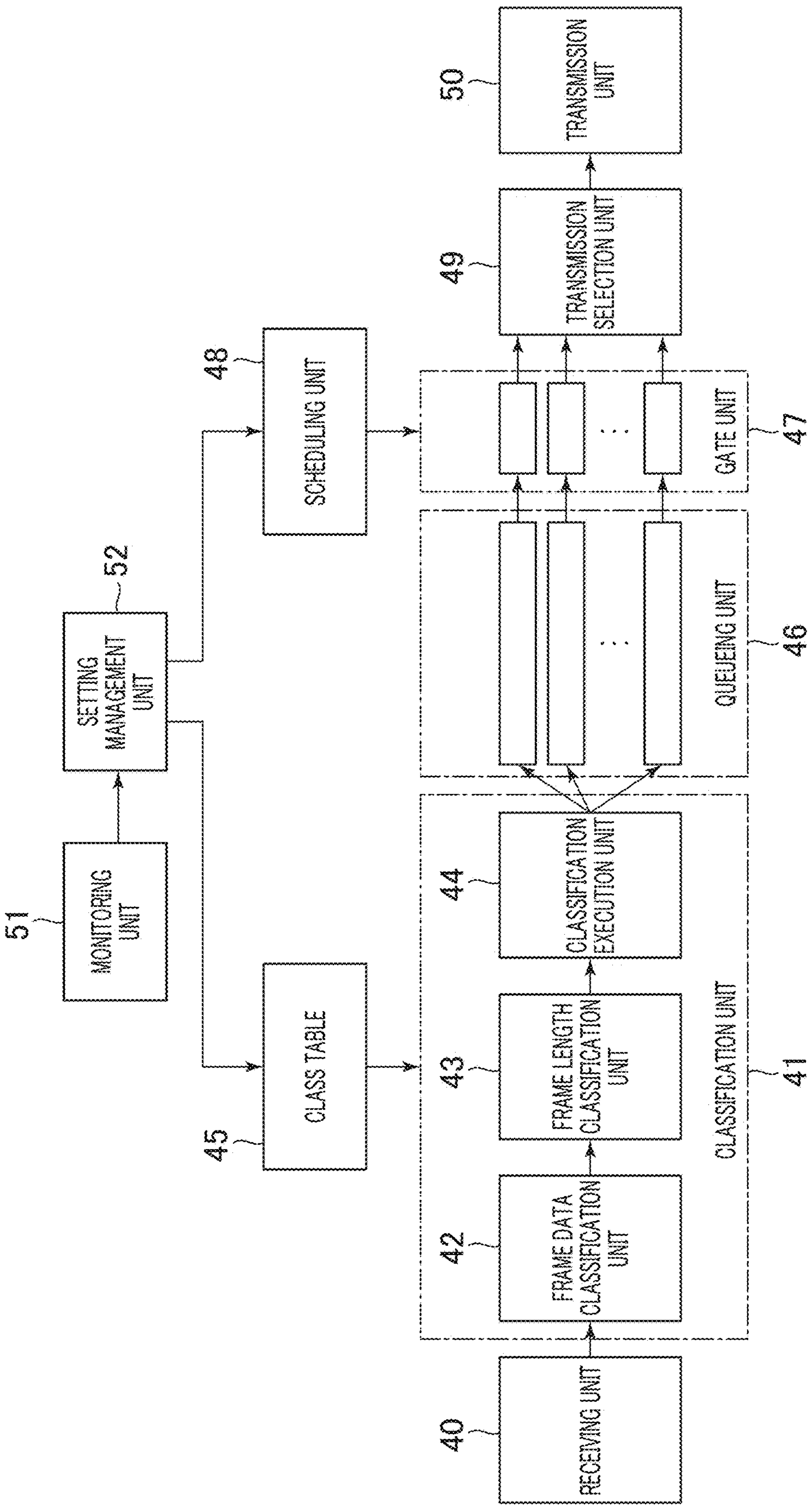
FIG. 19 is a block diagram of a communication device according to a third embodiment of the present invention.

FIG. 19 is a block diagram of the communication device 2 in the third embodiment.

The communication device 2 of the third embodiment includes a monitoring unit 51 and a setting management unit 52 in addition to the configuration (FIG. 10) described in the first embodiment. The monitoring unit 51 and the setting management unit 52 are implemented mainly to the CPU 7 (FIG. 2). The other parts of the communication device 2 are implemented to the network switch 6 similarly to the first embodiment.

The monitoring unit 51 monitors a state inside the communication device 2. For example, the monitoring unit 51 collects information on the receiving unit 40, the classification unit 41, the queueing unit 46, the gate unit 47, the transmission selection unit 49, and the transmission unit 50, and analyzes the information to monitor the state of the communication device 2.

Figure 20:
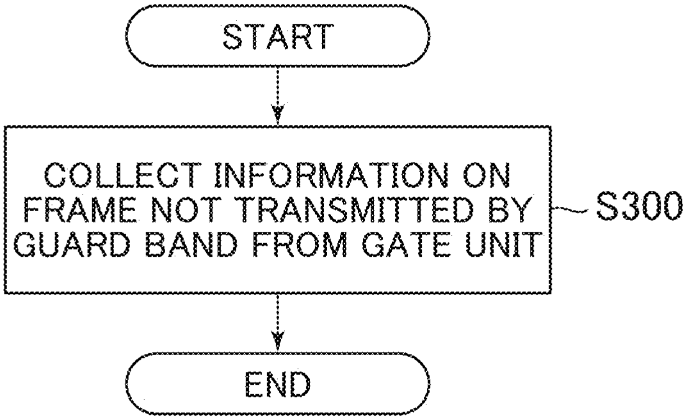
FIG. 20 is a flowchart illustrating a process of a monitoring unit according to the third embodiment of the present invention.

FIG. 20 is a flowchart illustrating an exemplary operation process of the monitoring unit 51.

The monitoring unit 51 collects, as an example of the monitoring, statistical information of the gate unit 47 for each class, and collects information on the frame inhibited to be transmitted by the guard band (Step S300). Specifically, the monitoring unit 51 collects the number and the frame lengths of the frames inhibited to be transmitted by the guard band.

The setting management unit 52 illustrated in FIG. 19 determines the setting change based on the state of the communication device 2 monitored by the monitoring unit 51, and changes the setting of the class table 45 and the scheduling unit 48.

Figure 21:
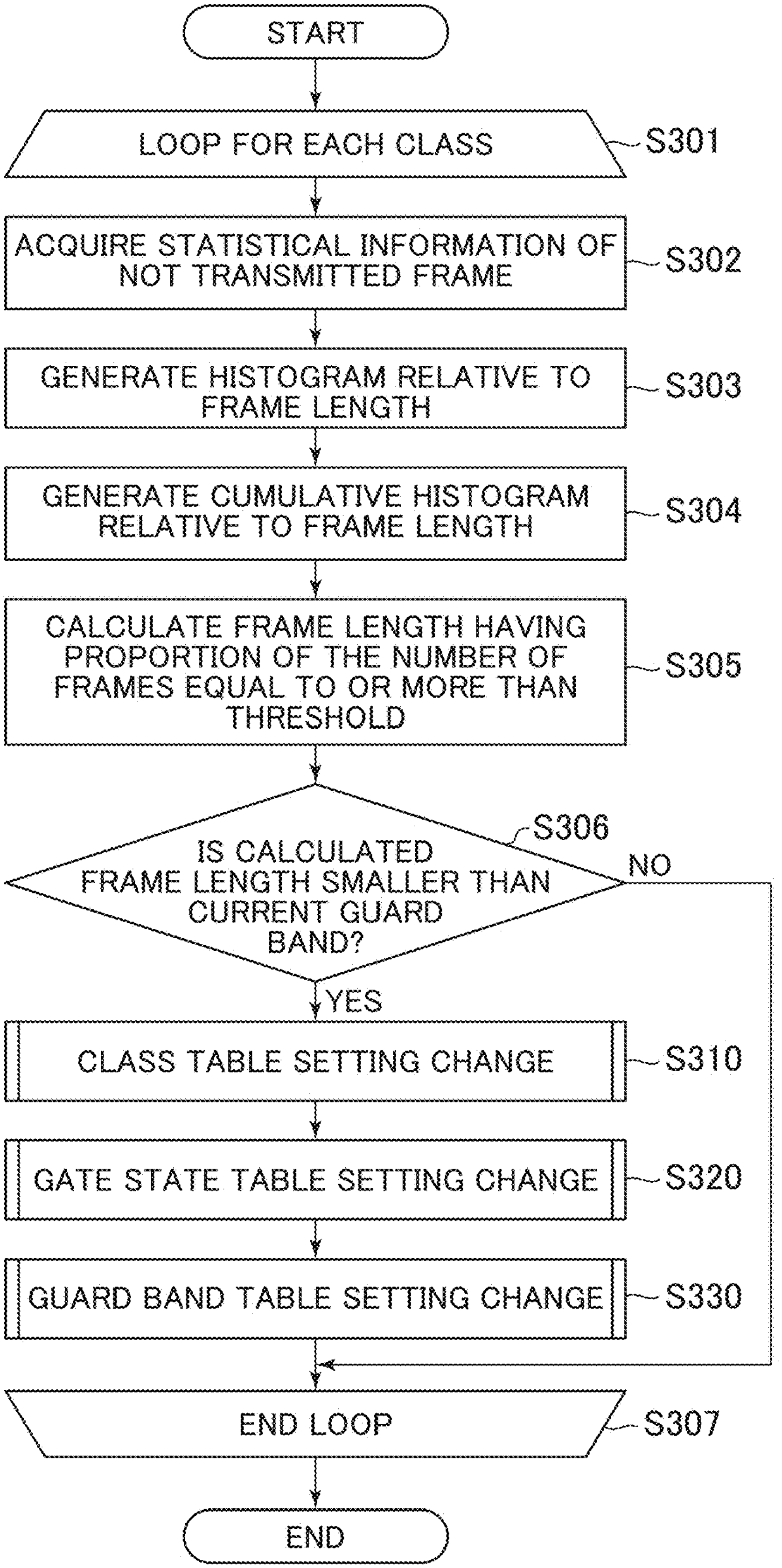
FIG. 21 is a flowchart illustrating a process of a setting management unit according to the third embodiment of the present invention.

FIG. 21 is a flowchart illustrating an exemplary operation process of the setting management unit 52.

The setting management unit 52 performs the following processes for each class (Step S301). First, the setting management unit 52 acquires the statistical information of the frame that has not been transmitted by the guard band from the monitoring unit 51 (Step S302). Subsequently, the setting management unit 52 produces a histogram relative to the frame length for the frame that has not been transmitted by the guard band based on the acquired information (Step S303). Subsequently, the setting management unit 52 integrates the number of frames from the minimum value of the produced histogram for each section, thus obtaining a cumulative histogram (Step S304). Further, the setting management unit 52 obtains the frame length at which a proportion of the number of frames of the cumulative histogram exceeds a threshold set in advance (Step S305).

Then, the setting management unit 52 determines whether or not the calculated frame length is smaller than the frame length currently used in dividing the class (Step S306). When it is smaller than the frame length used in dividing the class in Step S306 (YES in Step S306), the improved communication efficiency is expected by dividing the class, and therefore, the processes of Steps S310 to S330 below are executed.

That is, the setting management unit 52 changes the setting of a separately defined class table at first (Step S310). Subsequently, the setting management unit 52 changes the setting of a separately defined gate state table (Step S320). At last, the setting management unit 52 changes the setting of a separately defined guard band table (Step S330), and ends the loop (Step S307).

When it is not smaller than the frame length used in dividing the class in Step S306 (NO in Step S306), the setting management unit 52 omits the processes of Steps S310 to S330 and ends the loop (Step S307).

Figure 22:
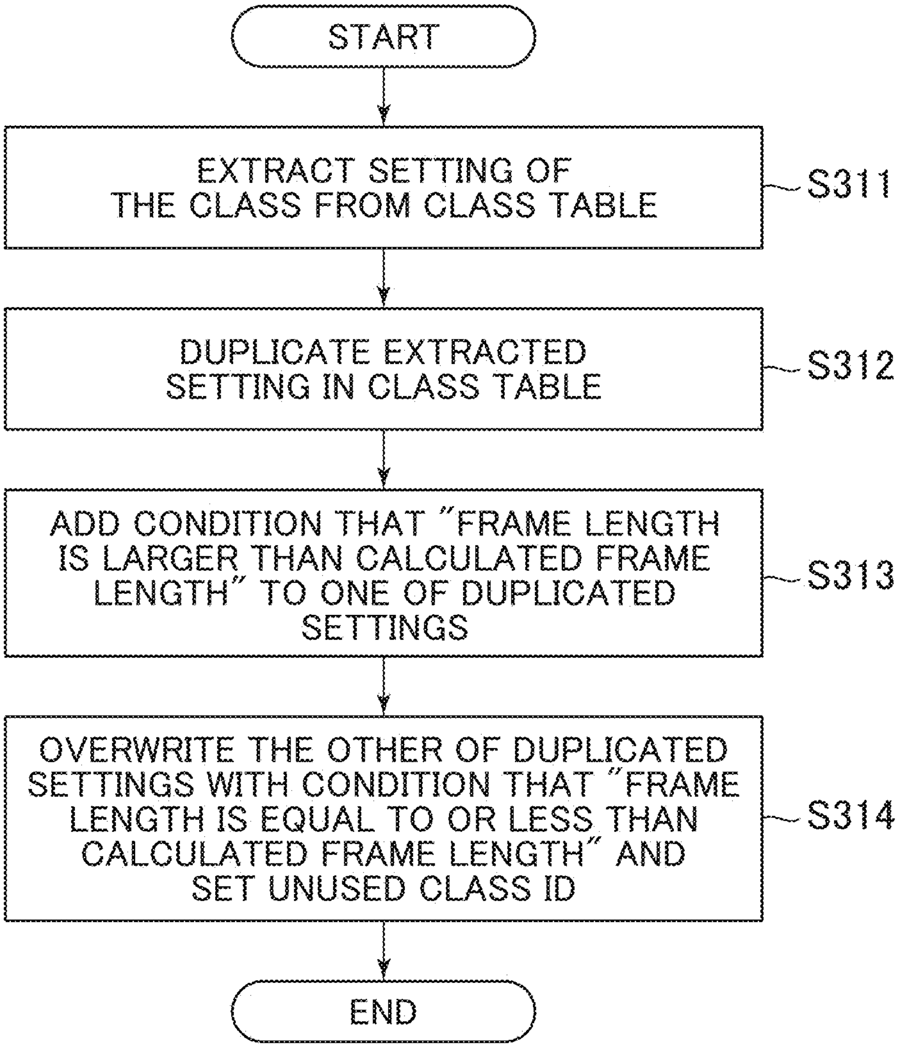
FIG. 22 is a flowchart illustrating a setting change process in a class table according to the third embodiment of the present invention.

FIG. 22 is a flowchart illustrating an operation process of the setting change of the class table 45.

First, the setting management unit 52 extracts the settings of the class from the class table 45 (Step S311). Subsequently, the setting management unit 52 duplicates the extracted settings in the class table (Step S312). Here, the setting management unit 52 adds a condition that "the frame length is larger than the calculated frame length" to one of the duplicated settings (Step S313). Further, the setting management unit 52 overwrites the other of the duplicated settings and sets a condition that "the frame length is equal to or less than the calculated frame length," and sets a currently unused class ID to the class ID (Step S314).

Figure 23:
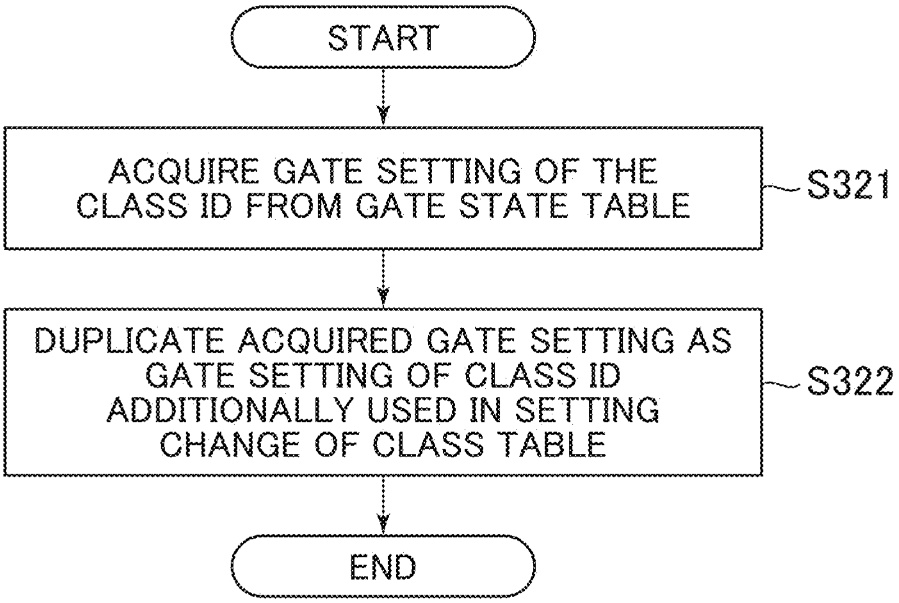
FIG. 23 is a flowchart illustrating the setting change process in a gate state table according to the third embodiment of the present invention.

FIG. 23 is a flowchart illustrating an operation process of the setting change of the gate state table 70.

In the setting change of the gate state table 70, first, the setting management unit 52 acquires the gate setting of the class ID from the gate state table 70 (Step S321). Subsequently, the setting management unit 52 duplicates the acquired gate setting and sets it to the gate setting of the class ID additionally used in the setting change of the class table (Step S322).

Figure 24:
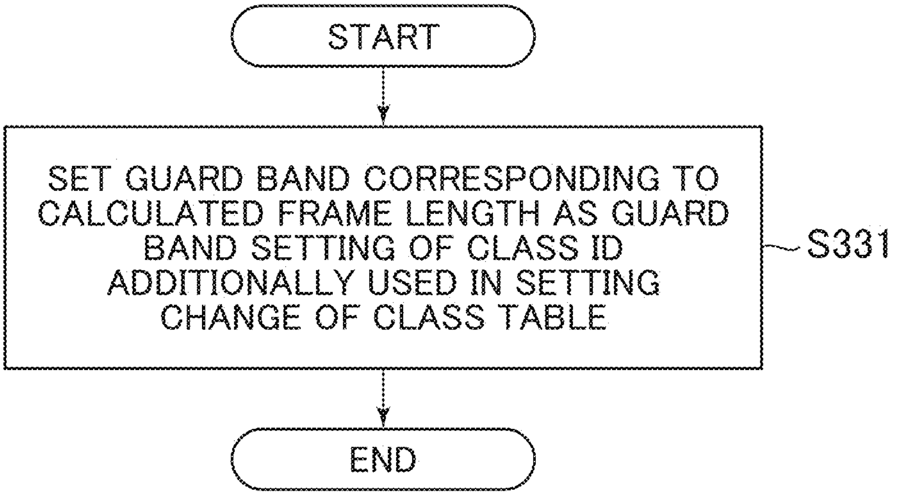
FIG. 24 is a flowchart illustrating the setting change process in a guard band table according to the third embodiment of the present invention.

FIG. 24 is a flowchart illustrating an operation process of the setting change of the guard band table 71.

In the setting change of the guard band table 71, the setting management unit 52 sets a guard band corresponding to the calculated frame length to the guard band setting of the class ID additionally used in the setting change (Step S310) of the class table (Step S331).

Thus, since the class table, the gate state table, and the guard band table are configured to be appropriately rewritable based on the statistical information of the communication device 2, that is, the characteristics of communication traffic, the appropriate guard band table corresponding to the communication conditions at that time can be set. For example, by acquiring the statistical information of the frame that has not been transmitted by the guard band, when many frames that have not been transmitted are present, the improved communication efficiency can be expected by further dividing the class.

By using the statistical information of the frames passing through the communication device 2 as the statistical information of the communication device 2 and estimating the operating pattern of the communication device 2 from the statistical information of the frames passing through the communication device 2, the settings of the class table, the gate state table, and the guard band table may be selected from the estimated operating pattern of the communication device 2.

Fourth Embodiment

Next, with reference to FIG. 25 and FIG. 26, the fourth embodiment of the present invention will be described.

In the fourth embodiment of the present invention, as a modification of the third embodiment, the settings of the class table 45 and the scheduling unit 48 are preliminarily held as a preset, and the setting is changed from the preset corresponding to the operating status of the communication device 2. Other configurations and processes are the same as the configurations and the processes in the first to the third embodiments, and therefore, the explanation is omitted.

The configuration of the communication device 2 in the fourth embodiment of the present invention is similar to the configuration of the communication device 2 in the third embodiment. However, the setting management unit 52 includes a setting preset table.

FIG. 25 illustrates an example of a setting preset table 80 included in the setting management unit 52. The setting preset table 80 holds a class table setting 82, a gate state table setting 83, and a guard band table setting 84 corresponding to a statistical information condition 81. These settings are preliminarily set with an assumption of the operating pattern of the communication device 2.

Figure 26:
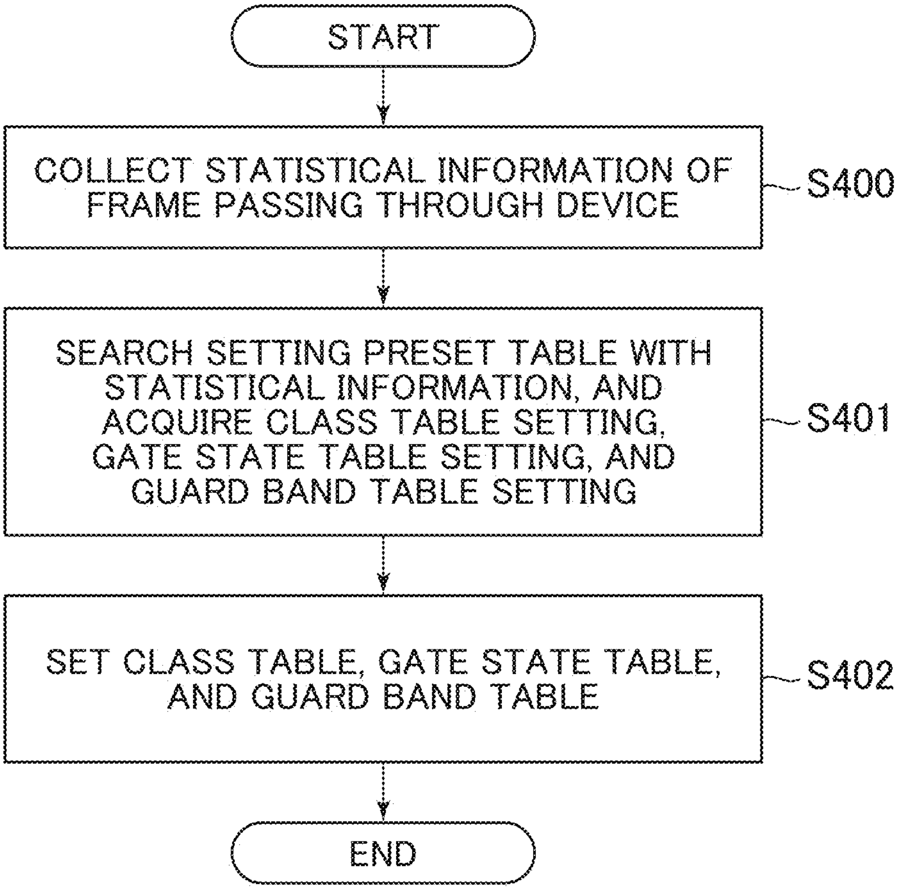
FIG. 26 is a flowchart illustrating a process of a setting management unit according to the fourth embodiment of the present invention.

FIG. 26 is a flowchart illustrating an operation process of the setting management unit 52 in the fourth embodiment.

The setting management unit 52 collects the statistical information of the communication device 2 from the monitoring unit 51 (Step S400). As the statistical information of the communication device 2, for example, the frame length, the frame reception cycle, and the number of frames for each class can be used. Alternatively, the state of the hardware/software of the communication device 2 can be monitored to be used as the statistical information.

Subsequently, the setting management unit 52 searches the setting preset table 80 with the collected statistical information, and acquires the optimal class table setting 82, gate state table setting 83, and guard band table setting 84 relative to the operating pattern of the communication device (Step S401).

At last, the setting management unit 52 uses the setting information to sequentially perform the setting change of the class table, the setting change of the gate state table, and the setting change of the guard band table (Step S402).

Collecting the statistical information, specifying the operating pattern of the communication device, and determining the setting preset may be performed by not the communication device 2 itself as a target, but another communication device 2 connected by the shared bus 5.

Fifth Embodiment

Next, with reference to FIG. 27 to FIG. 30, the fifth embodiment of the present invention will be described. In FIG. 27 to FIG. 30 illustrating the fifth embodiment, the same reference numerals are attached to parts corresponding to FIG. 1 to FIG. 26 described in the first to the fourth embodiments.

In the fifth embodiment of the present invention, as a modification of the third and the fourth embodiments, the respective settings of the class table 45, the gate state table 70, and the guard band table 71 are changed by Over-The-Air (OTA) from the outside of the vehicle. Other configurations and processes are the same as the configurations and the processes in the first to the fourth embodiments, and therefore, the explanation is omitted.

Figure 27:
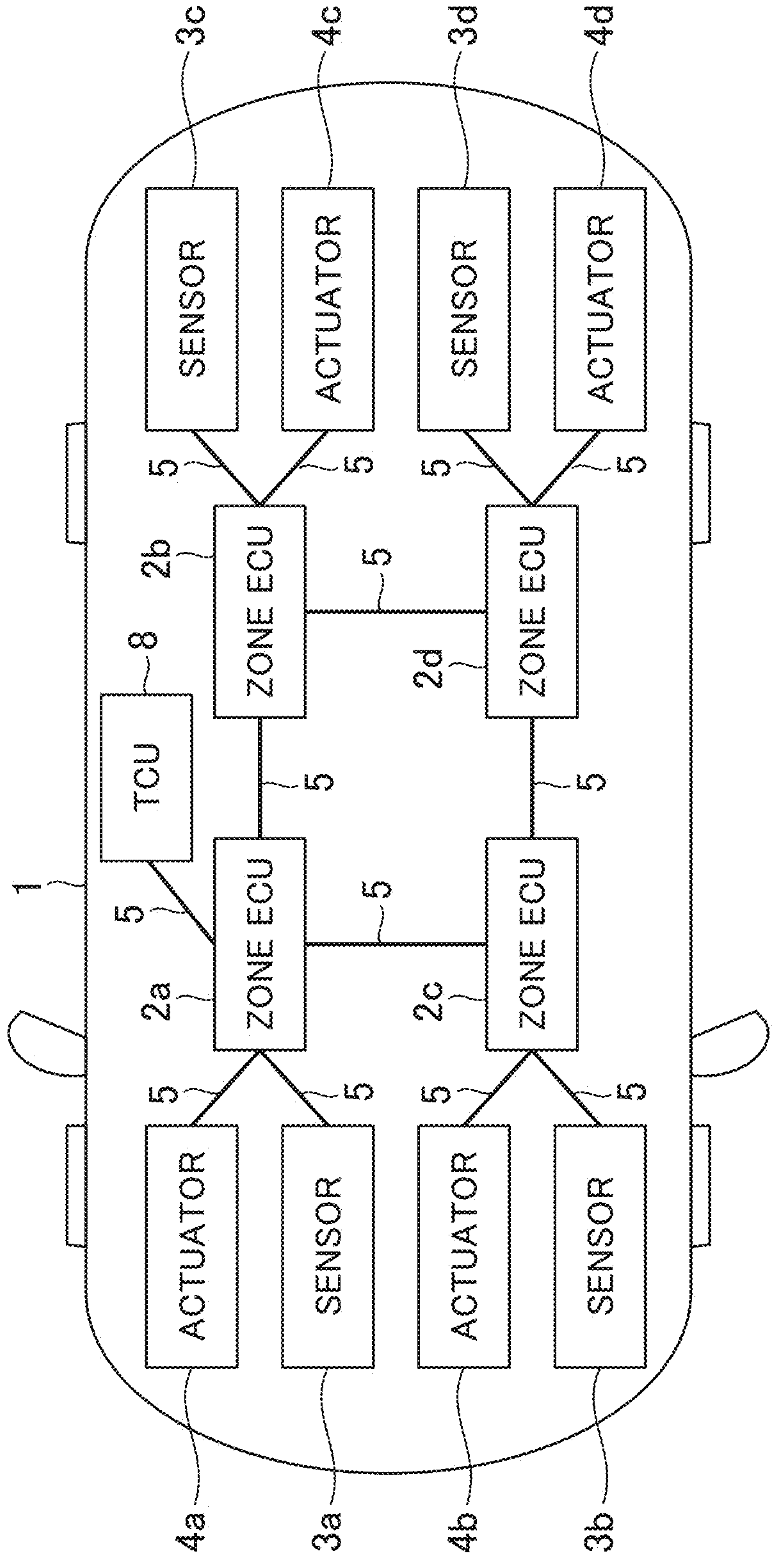
FIG. 27 is a drawing illustrating a network configuration of a communication device according to a fifth embodiment of the present invention.

FIG. 27 is a block diagram of an in-vehicle network in the fifth embodiment.

In the network inside the vehicle 1 illustrated in FIG. 27, a Tele-Communication Unit (TCU) 8 is added to the network illustrated in FIG. 1.

The TCU 8 is connected to any of the communication devices 2. The TCU 8 communicates with a communication device outside the vehicle. While the communication performed by the TCU 8 includes transmission of vehicle information, here, one for receiving information to change various settings is described.

Figure 28:
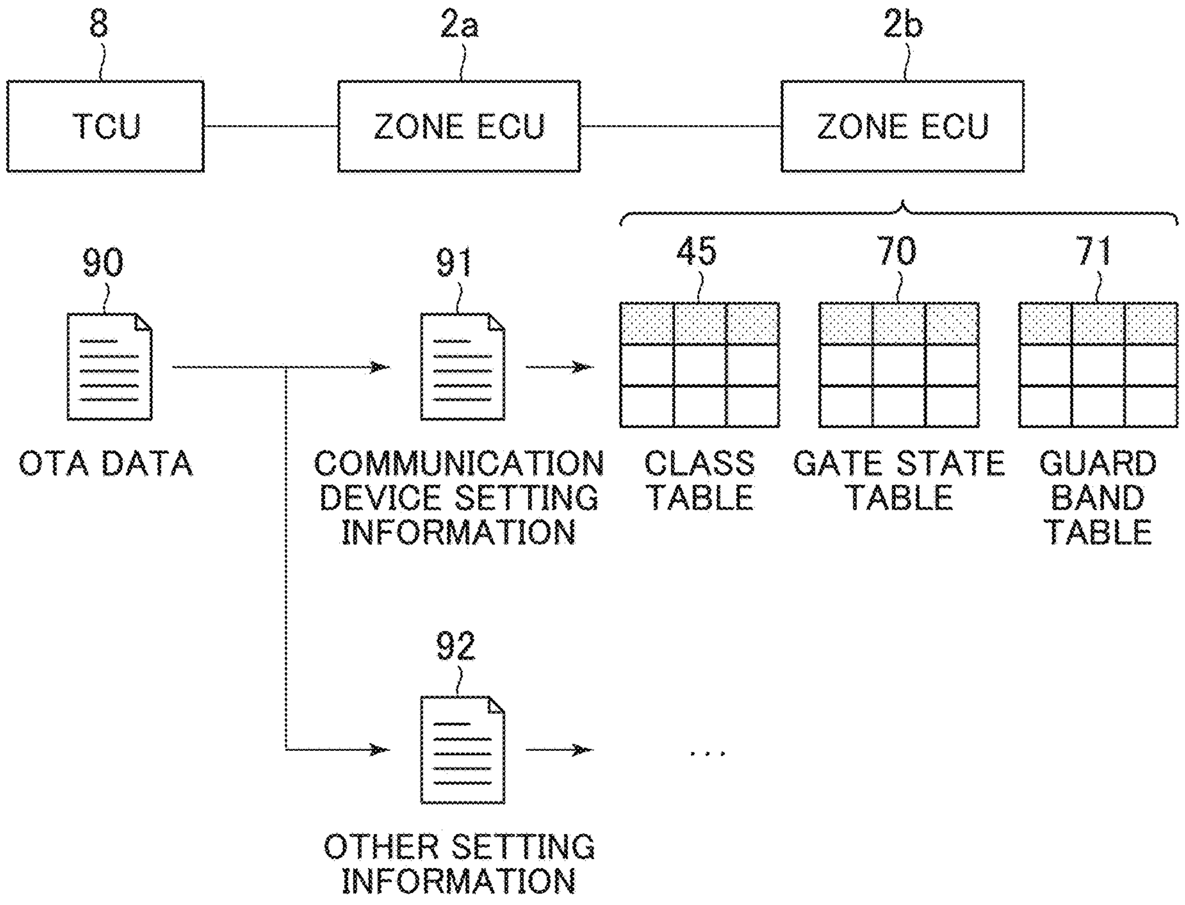
FIG. 28 is a schematic diagram illustrating a flow of setting update by OTA according to the fifth embodiment of the present invention.

FIG. 28 is a schematic diagram illustrating a flow of setting update by the OTA.

When the TCU 8 receives OTA data 90, the OTA data 90 is forwarded to a communication device 2*a* that performs an OTA process. In the communication device 2*a* that performs the OTA process, the setting information is divided for each setting destination.

For example, in the communication device 2*a*, the setting information is classified into setting information 91 of each communication device and other setting information 92. Then, the communication device 2*a* forwards the communication device setting information 91 to a corresponding communication device 2*b*. When the communication device 2*b* receives the setting information 91, the communication device 2*b* applies the setting. Here, the respective settings of the class table 45, the gate state table 70, and the guard band table 71 are applied.

Figure 29:
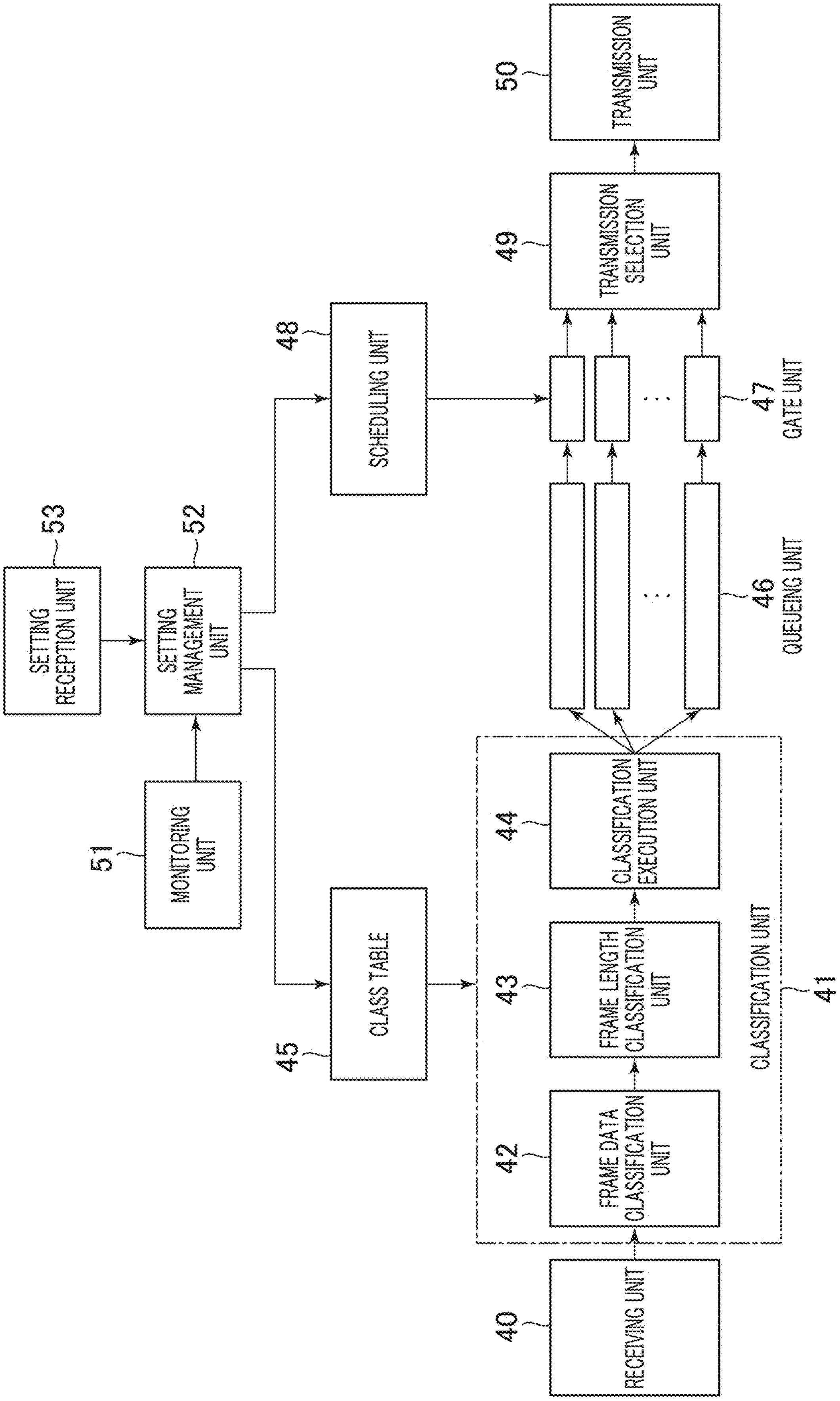
FIG. 29 is a drawing illustrating a configuration of the communication device according to the fifth embodiment of the present invention.

FIG. 29 is a block diagram of the communication device 2 in the fifth embodiment of the present invention.

The communication device 2 illustrated in FIG. 29 is different from the communication device 2 of the third embodiment in that a setting reception unit 53 is added.

The setting reception unit 53 waits for the setting change from the communication device 2*a* that performs the OTA process, and when the setting is input, the setting reception unit 53 performs setting of the communication device 2. The setting reception unit 53 is implemented mainly to the CPU 7. The monitoring unit 51 and the setting management unit 52 are implemented to the CPU 7 similarly to the third embodiment, and the other parts are implemented to the network switch 6 similarly to the first embodiment.

Figure 30:
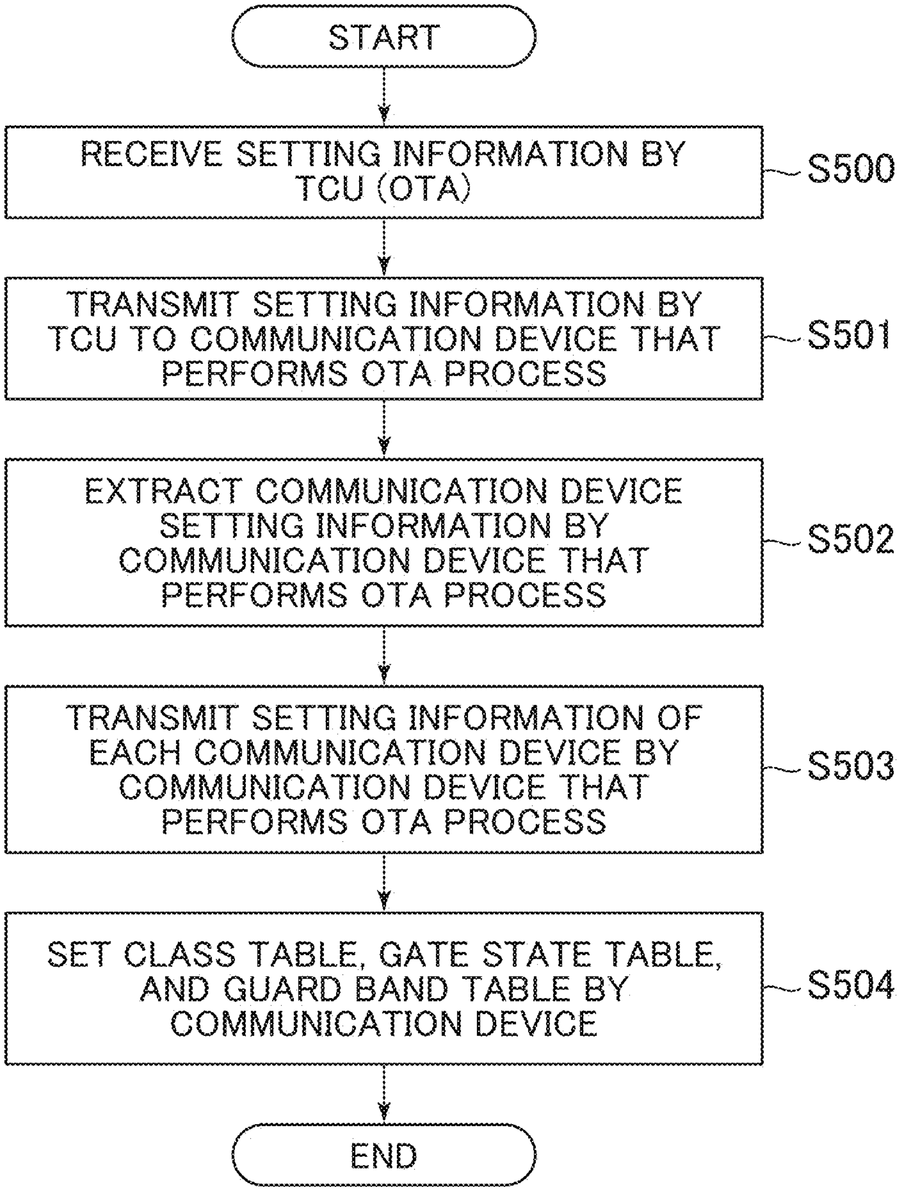
FIG. 30 is a flowchart illustrating the setting update by OTA according to the fifth embodiment of the present invention.

FIG. 30 is a flowchart illustrating an operation process of the setting update by the OTA in the fifth embodiment of the present invention.

First, the TCU 8 receives the setting information (Step S500), and the TCU 8 forwards the received setting information to the communication device 2*a* that performs the OTA process (Step S501).

Subsequently, the communication device 2*a* that performs the OTA process receives the setting information from the TCU 8, and classifies the setting information into the communication device setting 91 and the other settings 92 (Step S502). Subsequently, the communication device 2*a* that performs the OTA process forwards the communication device setting information 91 to each communication device 2*b* (Step S503).

When the communication device 2*b* as a setting target is the communication device 2*a* itself that performs the OTA process, actually the communication device setting information 91 is not transmitted, but it is assumed that the communication device setting information 91 is schematically forwarded inside the communication device 2*a*.

At last, the communication device 2*b* extracts the respective settings of the class table 45, the gate state table 70, and the guard band table 71 from the received communication device setting information 91 (Step S504), and updates the settings of the respective tables.

The classification of the setting information may be performed by not the communication device but the TCU.

Thus, since the class table, the gate state table, and the guard band table are configured to be rewritten by the communication with the outside of the vehicle, the setting of the guard band can be appropriately made based on the instruction from outside and the like. The communication with the outside of the vehicle is an example, and the rewrite may be similarly performed by the communication with another device inside the vehicle.

MODIFICATIONS

The embodiments described above are described in detail for easy understanding of the present invention, and the present invention is not necessarily limited to one including all the configurations described above. For example, as an application example of the network, the application to the in-vehicle network including the in-vehicle electronic device, such as a communication device 2, is an example, and the network including the communication device 2 described in each embodiment is also applicable to any network including a control network of a plant and the like and a telecommunications carrier network.

In the block diagrams illustrated in FIG. 1, FIG. 2, FIG. 10, and the like, only control lines and information lines considered to be necessary for the explanation are illustrated, and all the controls lines or information lines in a product are not necessarily illustrated. It may be considered that actually almost all the configurations are mutually connected.

For the time slot setting illustrated in FIG. 7 and the like and the frame structure illustrated in FIG. 8 and the like, appropriate examples are illustrated, and they are not limited to the examples of the drawings.

Further, the flows of the operation processes of the flowcharts illustrated in FIG. 13 and the like are also examples, and the order of a part of the processes may be changed, or a plurality of the processes may be simultaneously performed insofar as the same process result is obtained.

LIST OF REFERENCE SIGNS

1: vehicle
2, 2*a*, 2*b*: communication device
3: sensor
4: actuator
5: shared bus
6: network switch
7: CPU
8: TCU
40: receiving unit
41: classification unit
42: frame data classification unit
43: frame length classification unit
44: classification execution unit
45: class table
46: queueing unit
47: gate unit
48: scheduling unit
49: transmission selection unit
50: transmission unit
51: monitoring unit
52: setting management unit
53: setting reception unit
63: frame data condition table
64: frame length condition table
65: class condition table
70: gate state table
71: guard band table
80: setting preset table

The invention claimed is:

1. A communication device comprising:

a receiving unit that receives frames from an inside or an outside of a vehicle;

a classification unit that classifies the frames received by the receiving unit into at least two or more classes corresponding to information included in the frames;

a queueing unit that buffers the frames for each of the classes classified by the classification unit;

a gate unit that causes the frames queued by the queueing unit to pass through in a gate open state and blocks the passing in a gate closed state;

a scheduling unit that determines the open/closed state of the gate unit and sets a guard band as a transmission inhibition period at a proximity of an end time of the gate open state of the class, to ensure a data transmission timing of another class; and a transmission unit that transmits the frames passed through by the gate unit, wherein the classification unit includes:

a frame data classification unit that classifies the frames for each data condition of the frames;

a frame length classification unit that classifies the frames based on a frame length of the frame;

a class table that holds the data condition and a frame length condition of the frames and class data allocated based on the data condition and the frame length condition as classification criteria in the frame data classification unit and the frame length classification unit; and a classification execution unit that classifies the frames based on determination of the class of the frame by the class table, the scheduling unit sets a guard band width correspond to a frame maximum length of each class specified in the class table, and the gate unit controls the open/closed state to ensure the guard band width determined for each of the classes.

2. The communication device according to claim 1, wherein the scheduling unit includes:

a gate state table for controlling the gate open/closed state corresponding to each of the classes at each periodical time; and a guard band table for setting the guard band width of each of the classes, and the scheduling unit determines the open/closed state of the gate unit based on the gate state table and the guard band table.

3. The communication device according to claim 2, wherein the scheduling unit maintains the gate unit in the open state to the frame in transmission and closes the gate unit to the frame that has not yet been transmitted at a proximity of an end time of the gate open state of each of the classes, to ensure the guard band.

4. The communication device according to claim 2, wherein a criterion of the frame length classification in the class table and the guard band table are determined to be matched.

5. The communication device according to claim 2, wherein the class table, the gate state table, and the guard band table are appropriately rewritable based on a characteristic of a communication traffic.

6. The communication device according to claim 5, wherein as the characteristic of the communication traffic, statistical information of the frame that has not been transmitted by the guard band is used.

7. The communication device according to claim 5, wherein as the characteristic of the communication traffic, statistical information of the frame passing through the communication device is used, and an operating pattern of the communication device is estimated from the statistical information of the frame passing through the device, and a setting is selected from the estimated operating pattern of the communication device.

8. The communication device according to claim 2, wherein the class table, the gate state table, and the guard band table are rewritable by a communication.

9. The communication device according to claim 1, wherein the queueing unit includes at least two or more class-specific queues, the gate unit includes at least two or more class-specific gates, and the queue is connected to the gate in a same class.

10. The communication device according to claim 9, comprising a transmission selection unit that determines a transmission priority order of each of the frames and determines the transmission priority order of the frame when the gate units of a plurality of the classes are simultaneously opened and the frames are simultaneously output, at a rear of the gate unit.

11. The communication device according to claim 10, wherein the transmission unit transmits the frames in the order determined by the transmission selection unit.

12. The communication device according to claim 1, wherein the classification unit classifies the frames into a priority class and a non-priority class based on a content of data.

13. The communication device according to claim 1, wherein a data condition of the frame is a condition by a field value in a frame header, a value of at least a part of a frame payload, or a combination thereof.

14. An in-vehicle electronic device on which the communication device according to claim 1 is mounted.

* * * * *